US011192466B2

(12) United States Patent
Harty et al.

(10) Patent No.: US 11,192,466 B2
(45) Date of Patent: Dec. 7, 2021

(54) ELECTRIC CHARGE MANAGEMENT SYSTEM AND METHOD FOR A VEHICLE

(71) Applicant: Honda Motor Co., Ltd., Tokyo (JP)

(72) Inventors: Ryan D. Harty, Long Beach, CA (US); Jeremy Whaling, Carson, CA (US); Robert Uyeki, Torrance, CA (US); Sruthi Raju Nadimpalli, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 637 days.

(21) Appl. No.: 16/148,163

(22) Filed: Oct. 1, 2018

(65) Prior Publication Data
US 2020/0101850 A1 Apr. 2, 2020

(51) Int. Cl.
| | |
|---|---|
| *B60L 58/13* | (2019.01) |
| *G06Q 50/06* | (2012.01) |
| *G06Q 30/02* | (2012.01) |
| *B60L 53/64* | (2019.01) |
| *B60L 55/00* | (2019.01) |

(Continued)

(52) U.S. Cl.
CPC ............... *B60L 58/13* (2019.02); *B60L 53/64* (2019.02); *B60L 53/65* (2019.02); *B60L 53/665* (2019.02); *B60L 55/00* (2019.02); *G06Q 30/0283* (2013.01); *G06Q 50/06* (2013.01)

(58) Field of Classification Search
CPC .......... B60L 58/13; B60L 53/65; B60L 53/64; B60L 55/00; B60L 53/665; G06Q 50/06; G06Q 30/0283; H02J 3/32; H02J 3/38; H02J 7/0027
See application file for complete search history.

(56) References Cited

U.S. PATENT DOCUMENTS

| | | | |
|---|---|---|---|
| 8,478,452 B2 * | 7/2013 | Pratt | H02J 3/32 |
| | | | 700/297 |
| 9,026,347 B2 | 5/2015 | Gadh et al. | |
| 9,153,966 B2 | 10/2015 | Ishida | |

(Continued)

OTHER PUBLICATIONS

Albert Y. S. Lam, Capacity Estimation for Vehicle-to-Grid Frequency Regulation Services With Smart Charging Mechanism, IEEE Transactions on Smart Grid, Jun. 11, 2015, vol. 7, Issue: 1.

(Continued)

*Primary Examiner* — Daniel Kessie
*Assistant Examiner* — Brian K Baxter
(74) *Attorney, Agent, or Firm* — American Honda Motor Co., Inc.; Aaron Fong

(57) ABSTRACT

An electric charge management device for a vehicle includes a display screen and circuitry. The circuitry sets a first threshold value for a first discharge level of a battery of the vehicle. The first discharge level is greater than a zero state of charge (SOC) of the battery. The circuitry sets a second threshold value for a second discharge level of the battery based on first information associated with the vehicle and/or a user of the vehicle. The circuitry determines a first energy cost for an energy amount between the second discharge level and a current SOC of the battery. The circuitry controls the vehicle to transfer the energy amount to an external electric power system, which is different from the electric charge management device, based on the determined first energy cost.

3 Claims, 14 Drawing Sheets

(51) Int. Cl.
*B60L 53/65* (2019.01)
*B60L 53/66* (2019.01)

(56) References Cited

U.S. PATENT DOCUMENTS

| | | | |
|---|---|---|---|
| 9,457,680 B2 | 10/2016 | Shinzaki et al. | |
| 10,434,892 B2* | 10/2019 | Ko | H01M 10/625 |
| 2009/0030712 A1 | 1/2009 | Bogolea et al. | |
| 2013/0179061 A1* | 7/2013 | Gadh | B60L 53/51 701/123 |
| 2014/0354235 A1* | 12/2014 | Chauhdary | B60L 53/64 320/128 |
| 2015/0097512 A1 | 4/2015 | Li et al. | |
| 2015/0329003 A1 | 11/2015 | Li et al. | |
| 2016/0059733 A1* | 3/2016 | Hettrich | H04W 4/029 701/2 |
| 2016/0159239 A1 | 6/2016 | Shi et al. | |
| 2016/0178678 A1* | 6/2016 | Pelletier | G05B 15/02 705/39 |
| 2016/0288651 A1* | 10/2016 | Kinoshita | B60L 58/20 |
| 2016/0290305 A1* | 10/2016 | Kinoshita | F02N 11/0866 |
| 2016/0362013 A1* | 12/2016 | Gibeau | H02J 7/007 |
| 2017/0050529 A1* | 2/2017 | Lambert | B60L 58/12 |
| 2017/0151876 A1* | 6/2017 | Kinoshita | B60L 58/13 |
| 2017/0259683 A1* | 9/2017 | Shimizu | B60L 53/665 |
| 2018/0037121 A1* | 2/2018 | Narla | B60L 53/53 |
| 2018/0198145 A1* | 7/2018 | Watanabe | H01M 8/04932 |
| 2019/0139326 A1* | 5/2019 | Park | G01R 31/382 |
| 2019/0143829 A1* | 5/2019 | Ramanujam | H02J 3/14 701/22 |
| 2019/0202292 A1* | 7/2019 | Katanoda | B60L 55/00 |
| 2019/0280509 A1* | 9/2019 | Yokoyama | H02J 3/38 |
| 2019/0288347 A1* | 9/2019 | Yokoyama | H01M 10/42 |
| 2020/0094691 A1* | 3/2020 | Vidhi | G06Q 20/145 |
| 2021/0155100 A1* | 5/2021 | Khaligh | B60L 53/22 |

OTHER PUBLICATIONS

Nandha Kumar Kandasamy, Data-Driven Model Based Charging Profile Prediction for Energy Storage Systems, Preprints 2017, 2017100111.

* cited by examiner

ELECTRIC CHARGE MANAGEMENT SYSTEM AND METHOD FOR A VEHICLE

BACKGROUND

Many new technologies for electric vehicles and hybrid vehicles are being developed to improve power management of vehicle batteries. In certain scenarios, a user of a vehicle having an energy transfer capability, for example, a Vehicle-to-Grid (V2G) capability, may want to know if surplus energy is available in vehicle batteries. Further, the user may also want to monetize the surplus energy when available. Conventional solutions may be inefficient or may even lack an enabling technology to effectively assist the user in such decisions and consequent action(s), while balancing user requirements associated with the vehicle. Thus, an advanced system may be desired for vehicles for a balanced and efficient energy management of vehicle batteries.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electric charge management device for a vehicle may include a display screen configured to render a user interface (UI) and circuitry. The circuitry may be configured to set a first threshold value for a first discharge level of a battery of the vehicle. The first discharge level may be greater than a zero state of charge (SOC) of the battery. The circuitry may be further configured to receive first information associated with the vehicle or a user of the vehicle. The circuitry may be further configured to set a second threshold value for a second discharge level of the battery based on the received first information and a first energy amount of the battery. The first energy amount of the battery may be required for at least one operation associated with the vehicle, where the second threshold value may be greater than the first threshold value. The circuitry may be further configured to determine a first energy cost for a second energy amount between the second discharge level and a current SOC of the battery. The circuitry may be further configured to control the vehicle to transfer the second energy amount to an external electric power system, which may be different from the electric charge management device, based on the determined first energy cost.

An electric charge management device for a vehicle may include a memory configured to store a value of a discharge level of a battery of the vehicle. The discharge level may be greater than a zero state of charge (SOC) of the battery, and a first energy amount between the discharge level and the zero SOC may be required for at least one operation associated with the vehicle. The electric charge management device may further include circuitry coupled with the memory. The circuitry may be configured to determine a second energy amount between the discharge level and a current SOC of the battery. The circuitry may be further configured to receive first information and second information from a server. The first information may include a first energy cost at the time of retrieval of the first information from the server, and the second information may indicate a future energy cost for a specified time period. The circuitry may be further configured to compare the first information and the second information and determine a second energy cost for the second energy amount based on the comparison. The circuitry may be further configured to control the vehicle to transfer the second energy amount to an external electric power system, which is different from the electric charge management device, based on the determined second energy cost.

An electric charge management method in an electric charge management device for a vehicle. The electric charge management device may include a memory configured to store a value of discharge level of a battery of the vehicle. The discharge level may be greater than a zero state of charge (SOC) of the battery, and a first energy amount between the discharge level and the zero SOC may be required for at least one operation associated with the vehicle. The electric charge management method comprising determining a second energy amount between the discharge level and a current SOC of the battery. The electric charge management method further comprising receiving user information of a user of the vehicle from a server. The electric charge management method further comprising searching manufacturer information of the vehicle and employer information associated with the user in the server, based on the received user information. The electric charge management method further comprising determining a relationship between the received user information, the manufacturer information, and the employer information. The electric charge management method further comprising determining an energy cost for the second energy amount based on the determined relationship. The electric charge management method further comprising controlling the vehicle to transfer the second energy amount to an external electric power system, which is different from the electric charge management device, based on the determined energy cost.

DETAILED DESCRIPTION

Figure 1:
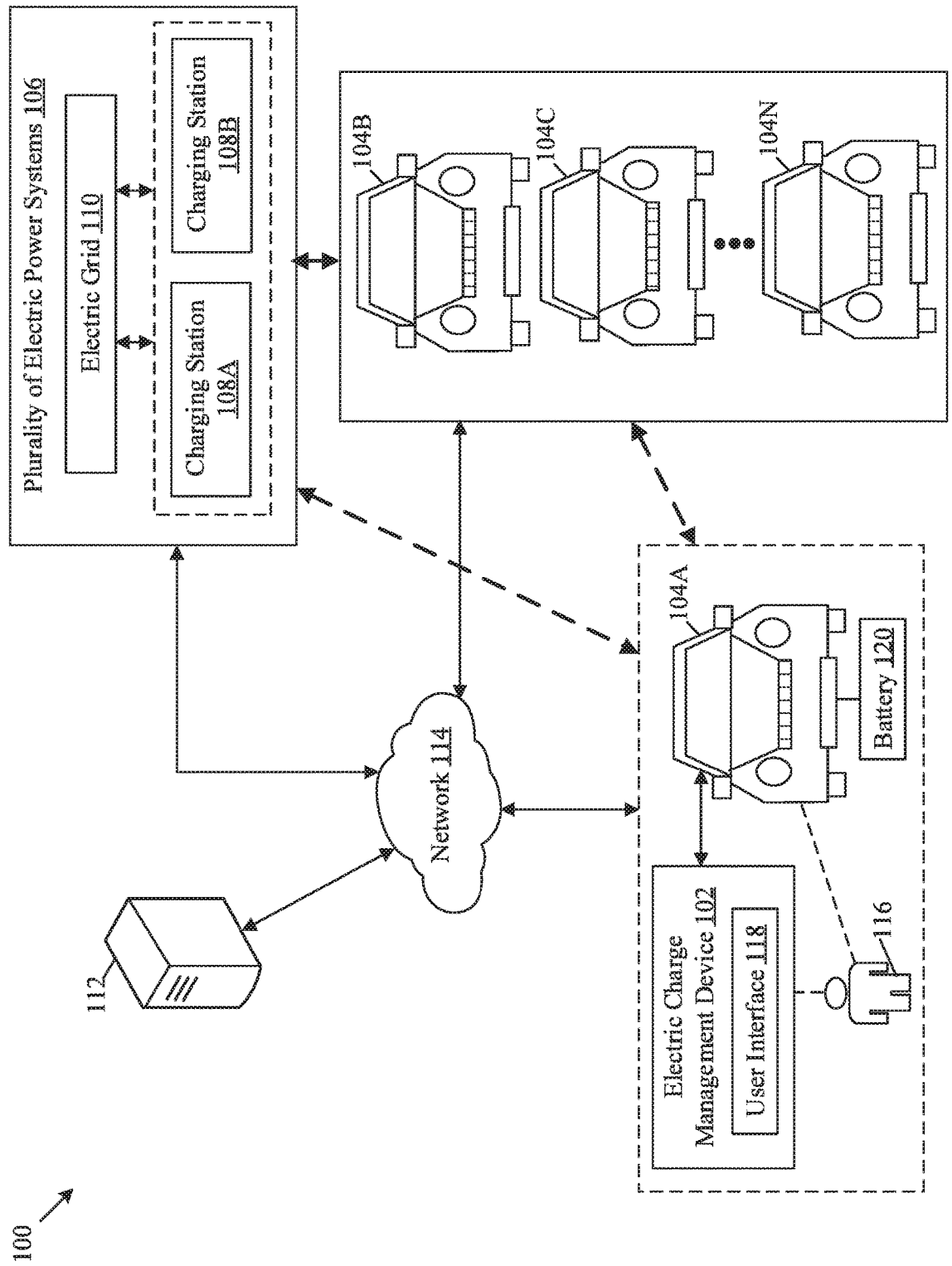
FIG. 1 is a block diagram that illustrates an exemplary first network environment for an electric charge management system, in accordance with an embodiment of the disclosure.

Various embodiments of the present disclosure may be found in an electric charge management system for a vehicle. The disclosed electric charge management system includes an electric charge management device. The electric charge management device facilitates a user of a vehicle (for example, an electric vehicle) to trade energy savings (in terms of Ampere-hour (Ah) capacity, a State-of-Charge (% SOC) of the vehicle battery, Kilowatt Hour (KWh), or megajoule (MJ)) to an electric power system in exchange for different benefits, such as monetary benefits, $CO_2$ savings, and other incentives. Examples of the electric power system may include, but is not limited to an electrical power grid, a vehicle battery of other vehicles in vicinity of the user's vehicle, a charging station, an electrical power storage apparatus, or other electric power system of individual businesses or homes. The user may be incentivized to share surplus energy in a vehicle battery from the vehicle to different energy sources (i.e., electric power systems) that have an increasing demand for energy from affordable energy sources.

The disclosed electric charge management device may set minimum SOC requirements for a vehicle's battery, based on user input. The minimum SOC requirements may mandate to limit an amount of energy in the vehicle battery that could be shared with various electric power systems. The limitation may prevent an over-discharge of the vehicle's battery below a usable battery capacity such that a user is able to utilize the vehicle for different activities without a requirement of additional charge.

In some embodiments, the disclosed electric charge management device ensures a balanced estimation of threshold values based on trained artificial intelligence (AI) models. The AI models may be models that take into account various factors to suggest balanced threshold values to a user. Example of such factors may include, but are not limited to environmental information, historical travel information of the vehicle, calendar information of the user, user-preference information of the user, carbon dioxide ($CO_2$) saving information of the vehicle, financial saving information of the user, charging-discharging information of the battery, and/or an output from a learning engine (e.g., an AI engine).

The disclosed electric charge management device may provide incentive benefits to the user of the vehicle by determining a relationship between the user of the vehicle and one or more of the manufacturer of the vehicle, employer-employee information of users of the vehicle, and a current and a future energy price (or cost). Based on the determined relationship, the disclosed electric charge management device ensures incentive benefits for a user or an employee (also an owner of a vehicle), where, the user or employee provides the excess energy of the vehicle battery to a vehicle battery of another vehicle owned by another user or employee having a common employer and/or a common vehicle manufacturer.

FIG. 1 is a block diagram that illustrates an exemplary first network environment for an electric charge management system, in accordance with an embodiment of the disclosure. With reference to FIG. 1, there is shown a first network environment 100. The first network environment 100 may include an electric charge management device 102, a plurality of vehicles 104A, 104B, 104C, . . . , 104N, a plurality of electric power systems 106, a plurality of charging stations 108A and 108B, an electric grid 110, a server 112, and a network 114. There is further shown a user 116 that is associated with at least one of the plurality of vehicles 104A, 104B, 104C, . . . , 104N.

The electric charge management device 102 may comprise suitable logic, circuitry, interfaces, and/or code that may be configured to control the plurality of vehicles 104A, 104B, 104C, . . . , 104N to execute an energy transfer operation to at least one of the plurality of electric power systems 106, such as a Vehicle-to-Grid (V2G) energy transfer. The electric charge management device 102 may receive one or more user inputs from the user 116 and may control the energy transfer operation associated with one of the plurality of vehicles 104A, 104B, 104C, . . . , 104N based on the received one or more user inputs. The electric charge management device 102 may receive various information related to one of the plurality of vehicles 104A, 104B, 104C, . . . , 104N via a user interface (UI). In some embodiments, the electric charge management device 102 may be integrated in at least one of the plurality of vehicles 104A, 104B, 104C, . . . , 104N. The plurality of vehicles 104A, 104B, 104C, . . . , 104N may include a first vehicle 104A and a first set of vehicles 104B to 104N. In some embodiments, the electric charge management device 102 may be integrated into the first vehicle 104A. Alternatively, each of the plurality of vehicles 104A, 104B, 104C, . . . , 104N may include the electric charge management device 102. Examples of the electric charge management device 102 may include, but are not limited to, a vehicle control system, an in-vehicle infotainment (IVI) system, in-car entertainment (ICE) system, an embedded device, a smartphone, a human-machine interface (HMI), a computer workstation, a mainframe computer, a handheld computer, a cellular/mobile phone, a consumer electronic (CE) device, a server, and other computing devices.

The plurality of vehicles 104A, 104B, 104C, . . . , 104N may comprise suitable logic, circuitry, interfaces, and/or code that may be configured to execute the V2G energy transfer operation, "G" corresponds to an electric power system of the plurality of electric power systems 106. Each of the plurality of vehicles 104A, 104B, 104C, . . . , 104N may communicate with the electric charge management device 102 directly or via the network 114. Each of the plurality of vehicles 104A, 104B, 104C, . . . , 104N may be configured to connect with the electric grid 110 via the plurality of charging stations 108A and 108B to transfer the electric energy. Each of the plurality of vehicles 104A, 104B, 104C, . . . , 104N may be further configured to communicate with the server 112 via the network 114. Each of the plurality of vehicles 104A, 104B, 104C, . . . , 104N may be a non-autonomous, a semi-autonomous, or an autonomous vehicle. Examples of the plurality of vehicles 104A to 104N may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

Each of the plurality of electric power systems 106 may comprise suitable logic, circuitry, interfaces and/or code that may be configured to receive from as well as transmit electric power to other energy sources, such as the plurality of vehicles 104A, 104B, 104C, . . . , 104N. The plurality of electric power systems 106 may include the plurality of charging stations 108A and 108B and the electric grid 110. Examples of the plurality of electric power systems 106 may include, but are not limited to power generation systems (coal, wind, nuclear, solar, hydro, etc.), electrical power grids, vehicle batteries of other vehicles in vicinity of the user's vehicle, charging stations, an electrical power storage apparatus, or other electric power system of individual businesses or homes.

The plurality of charging stations 108A and 108B may comprise suitable logic, circuitry, interfaces and/or code that may be configured to transfer electrical energy between each of the plurality of vehicles 104A, 1046, 104C, . . . , 104N and the electric grid 110. The plurality of charging stations 108A and 1086 may be configured to process the electric energy transferred between each of the plurality of vehicles 104A to 104N and the electric grid 110. Examples of the plurality of charging stations 108A and 108B may include, but are not limited to an electric vehicle (EV) charging station, an electric recharging point, an electronic charging station, an electric vehicle supply equipment (EVSE), a Direct Current (DC) fast charging station, a home charging station, a domestic electrical socket, a level 1 charging station, a level 2 charging station, or a level 3 charging station.

The electric grid 110 may be a managed network of high voltage (HV) power transmission lines, sub-stations, low voltage (LV) distribution lines, and generation facilities (e.g., power plants that deliver power on an electric grid). The electric grid may be configured to deliver electric energy to the plurality of vehicles 104A, 104B, 104C, . . . , 104N through the plurality of charging stations 108A and 108B. In some embodiments, the electric grid 110 may be configured to receive the electric energy from the plurality of vehicles 104A, 104B, 104C, . . . , 104N through the plurality of charging stations 108A and 108B. The electric grid 110 may be configured to deliver the electric energy to the plurality of vehicles 104A, 1046, 104C, . . . , 104N and the plurality of charging stations 108A and 108B through various transmission and distribution lines. Example of the electric grid 110 may include, but are not limited to, a micro-grid, a national grid, a smart grid, and other electric energy generation facilities.

The server 112 may comprise suitable circuitry, interfaces, and/or code that may be configured to store information associated with the electric charge management device 102 or the user 116. The server 112 may be configured to store information associated with the plurality of vehicles 104A, 104B, 104C, . . . , 104N and one or more users (such as the user 116). In some embodiments, the server 112 may be further configured to store information related to the electric grid 110 and the plurality of charging stations 108A and 108B. The server 112 may be configured to communicate with the electric charge management device 102 and the plurality of vehicles 104A, 104B, 104C, . . . , 104N, via the network 114. In some embodiments, the server 112 may be implemented as a cloud server, which may be utilized to execute various operations through web applications, cloud applications, HTTP requests, repository operations, file transfer, gaming operations, and the like. Examples of the server 112 may include, but are not limited to, an application server, a cloud server, a web server, a database server, a file server, a mainframe server, or a combination thereof.

The network 114 may include a communication medium through which the electric charge management device 102 may communicate with the plurality of vehicles 104A, 104B, 104C, . . . , 104N, and the server 112. Examples of the network 114 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the first network environment 100 may be configured to connect to the network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, in response to a preset instruction stored in the electric charge management device 102 or a user input, the electric charge management device 102 may be configured to present a user interface (UI) 118 to a user 116, on the electric charge management device 102. Examples of the UI 118 may include, but are not limited to a touch-based user interface, a command based user interface, a graphical user interface (GUI), a gesture based user interface, or a menu-based user interface. The presented UI 118 may include a plurality of data items related to the first vehicle 104A. Examples of the plurality of data items may include, but are not limited to, battery information associated with a state-of-charge (SOC) of a battery 120 of the first vehicle 104A, vehicle information related to operations and functionalities of the first vehicle 104A, and user information related the user 116.

The electric charge management device 102 may be configured to receive a first user input, from the user 116, via the presented UI 118. The received first user input may include information associated with one or more user preferences of the user 116 with respect to the first vehicle 104A. The one or more user preferences may include, but are not limited to, driving preferences, such as a preferred route, a preferred location, a preferred address, a starting point and a destination point on a map, and a landmark, and a user preference to execute one or more of the plurality of operations associated with the first vehicle 104A. Examples of the plurality of operations of the first vehicle 104A may include, but are not limited to, a heating ventilation and air conditioning (HVAC) operation, an entertainment operation, a lighting operation, a sensing operation, a vehicle configuration operation, or a propulsion operation.

The electric charge management device 102 may be configured to retrieve, from the server 112, first information associated with the first vehicle 104A and/or the user 116 of the first vehicle 104A. In some embodiments, the first information may be stored in the electric charge management device 102. Examples of the first information may include, but are not limited to environmental information, historical travel information of the first vehicle 104A, calendar information of the user 116, user-preference information of the user 116, or carbon dioxide ($CO_2$) saving information of the first vehicle 104A. The first information may further include at least one of: financial saving information of the user 116, charging-discharging information of the battery of the first vehicle 104A, or navigational information of the first vehicle 104A to reach to the destination point.

The electric charge management device 102 may transmit vehicle identification information (such as, a unique vehicle registration number) of the first vehicle 104A to the server 112 to retrieve the first information. In some embodiments, the electric charge management device 102 may transmit user identification information of the first vehicle 104A to the server 112 to retrieve the first information. Examples of the user identification information of the user 116 may include, but are not limited to, a name of the user 116, an address of the user 116, a unique user ID, or a social security number (SSN) of the user 116.

The plurality of operations of the first vehicle 104A may cause a consumption of the stored electric energy from the battery 120 of the first vehicle 104A. For example, the environmental information (such as temperature) in the first information may indicate an effect on a capacity, a charge rate, and a discharge rate (C-rate) of the battery of the first vehicle 104A, which may further affect an accurate calculation of a current SOC of the battery 120. Thus, the calculation of the current SOC may vary based on variations in the temperature in external environment of the battery 120.

The historical travel information may indicate a past driving pattern (such as a slow speed, a fast speed, rash driving, and careful driving) of the user 116, information related to different routes previously travelled, and a usual time-period of travel of the user 116. The information related to different routes may also include traffic information. The historical travel information of the first vehicle 104A or the user 116 (with a different vehicle or a different travel resource) may also indicate an effect on a consumption of the electric energy of the battery 120 to execute the plurality of operations for different vehicles or users. The calendar information associated with the user 116 may indicate upcoming one or more meeting schedules or invites associated with the user 116. The one or more meeting schedules or invites may require that the user 116 travels one or more times between in certain routes, using the first vehicle 104A.

The $CO_2$ saving information may indicate an amount by which $CO_2$ emissions can be reduced for the first vehicle 104A by sharing stored electric energy in the battery 120 with one of the plurality of electric power systems 106, such as other electric vehicles or non-electric vehicles. Based on sharing of the stored electric energy, consumption of excess energy may be reduced (e.g., that may supply power based on fossil fuels (i.e. fuels that emit $CO_2$ after combustion)), which may result in $CO_2$ savings for the first vehicle 104A. Also, the $CO_2$ saving information may indicate how much $CO_2$ emission (in $gCO_2/Km$) has to be achieved with the first vehicle 104A in order to efficiently reduce a carbon footprint of the first vehicle 104A.

The electric charge management device 102 may be configured to estimate the consumption of the required electric energy from the battery 120 based on the $CO_2$ saving information, weight, power and performance of the first vehicle 104A. The financial saving information may indicate a preference of the user 116 related cost savings (e.g., a savings goal of "10000 USD" in "6 months") with respect to the first vehicle 104A. In certain embodiments, the financial information may also include a potential amount by which the user 116 would prefer to reduce a total cost of ownership (TCO) of the first vehicle 104A.

The electric charge management device 102 may be configured to control a consumption of the electric energy from the battery 120 based on the preference of the user 116 related to the cost savings. The preference of the user 116 related to the cost savings may correspond to an energy saving mode of the first vehicle 104A. The electric charge management device 102 may be configured to alert the user 116 to turn-off certain operations of the first vehicle 104A based on the financial saving information. Further, the charging-discharging information of the battery 120 may indicate information related to a charging cycle and a discharging cycle of the battery 120 of the first vehicle 104A. Different types of batteries 120 (for example, lead battery, and lithium battery which have different information related to the charging cycle and the discharging cycle) may affect the consumption of the electric energy in the battery 120 in different ways.

The electric charge management device 102 may be configured to estimate a first energy amount of the battery 120 based on the received first information and the received one or more user preferences. The first energy amount may indicate a first measure of the electric energy of the battery 120, which may be required by the first vehicle 104A to execute one or more of the plurality of operations of the first vehicle 104A, in accordance with the received one or more user preferences and the received first information. The first energy amount may be estimated in different units, for example, in Kilowatt Hour (KWh), megajoule (MJ), Watts (W), ampere-hour (Ah), a state of charge (SOC) or a percentage of actual battery capacity.

The electric charge management device 102 may be configured to receive one or more user inputs to set threshold values for discharge levels of the battery 120. The one or more user inputs may include a first threshold value for a first discharge level of the battery 120 of the first vehicle 104A. The first discharge level may correspond to a low battery level or a low SOC of the battery 120 of the first vehicle 104A. The first discharge level may indicate how low the capacity (in Amp-Hours or % SOC) of the battery 120 can deplete and may further restrict the electric charge management device 102 to prevent the battery capacity to fall below the first threshold value. The first discharge level may be greater than a zero SOC of the battery 120 of the first vehicle 104A. For example, the first threshold value for the first discharge level may be 10% SOC of the battery 120. The electric charge management device 102 may be configured to control the depletion of the battery 120 beyond the first discharge level of the battery 120. Thus, the first threshold value for the first discharge level received by the user 116 may ensure that the capacity of the battery 120 does not deplete to the zero SOC to avoid unwanted damage to the battery 120 (e.g., caused by deep discharge of the battery 120). Such control on the battery 120 of the first vehicle 104A by the electric charge management device 102 further enhances the overall life of the battery 120 of the first vehicle 104A.

The one or more user inputs may further include a second threshold value for a second discharge level of the battery 120 of the first vehicle 104A. The second discharge level may be greater than the first discharge level. The electric charge management device 102 may designate an energy amount between the first discharge level and the second discharge level as the first energy amount of the battery 120 required by the first vehicle 104A to execute one or more of the plurality of operations of the first vehicle 104A, based on the received one or more user preferences and the received first information.

The electric charge management device 102 may be configured to receive the second threshold value as a user input from the user 116 and validate (or update) the second threshold value based on the received first information and the determined first energy amount. For example, the second threshold value may be updated (for example, 60% of SOC of the battery 120) as a sum of the first threshold value (for example, 10% SOC of the battery 120) and the first energy amount (for example, 50% SOC of the battery 120). The first discharge level and the second discharge level the battery 120, are described in detail, for example, in FIGS. 4A and 4B.

The electric charge management device 102 may be further configured to determine the current SOC of the battery 120 of the first vehicle 104A. The electric charge management device 102 may be configured to determine the current SOC of the battery 120 by application of at least one of a voltage-based SOC estimation technique, a hydrometer-based SOC estimation technique, a coulomb counting based estimation technique, a Kalman filtering based estimation technique, a pressure-based estimation technique, and/or an impedance-based SOC estimation technique on the battery 120.

The electric charge management device 102 may be further configured to compute a difference between the current SOC and the first discharge level. The difference between the current SOC and the first discharge level may be indicative of remaining battery information (e.g., battery capacity in terms of amp-hours) of the battery 120. The remaining battery information of the battery 120 may include information associated with a total amount of electric energy which may be stored in the battery 120 and may be consumed to execute one or more of the plurality of operations of the first vehicle 104A. The total amount of electric energy stored in the battery 120 may include the first energy amount required by the first vehicle 104A to execute one or more of the plurality of operations and may further include a second energy amount. The second energy amount of the battery 120 may correspond to an energy amount, between the current SOC and the second discharge level, which may be transferred to the one or more of the plurality of electric power systems 106. The second energy amount may be an excess (or surplus) energy amount of the battery 120 to be transferred to the one or more of the plurality of electric power systems 106 after the utilization of the first energy amount to execute one or more of the plurality of operations of the first vehicle 104A.

The electric charge management device 102 may retrieve, from the server 112, a current energy cost of electricity in the electric grid 110. The current energy cost may include a price per one unit of electricity in the electric grid 110 at the location of the electric charge management device 102 or the first vehicle 104A. The electric charge management device 102 may be configured to determine a first energy cost for the second energy amount based on the current energy cost at that location. More specifically, the first energy cost is a potential selling price (e.g., in terms of revenue) at which the excess energy stored in the battery 120 can be sold to different electric power systems 106, without an effect on daily (or usual) operations of the first vehicle 104A. In response to a user's acceptance to sell the excess energy amount of the battery 120 to the one or more of the plurality of electric power systems 106 at the first energy cost, the electric charge management device 102 may control the first vehicle 104A to transfer the second energy amount to one of the plurality of electric power systems 106. The electric charge management device 102 may be configured to control the first vehicle 104A to transfer the second energy amount, based on the determined first energy cost. The first vehicle 104A may be configured to transfer the second energy amount to the electric grid 110 by execution of a vehicle to grid (V2G) operation. The V2G operation to transfer the second energy amount from the battery 120 of the first vehicle 104A to one of the plurality of electric power systems 106, is described in detail, for example, in FIG. 6.

The electric charge management device 102 may be configured to receive, from the user 116, a first time-period for charging the battery 120 and a second time-period (different from the first time-period) for the energy transfer. For example, the electric charge management device 102 may be configured to control the first vehicle 104A to charge the battery 120 in day time (when solar energy is available) and sell the excess electric energy in night time. The electric charge management device 102 may be further configured to determine a current time of day associated with a current geo-location of the first vehicle 104A. The electric charge management device 102 may be further configured to control the first vehicle 104A to charge the battery 120 (from the current SOC to a maximum SOC) or to transfer the second energy amount to one of the plurality of electric power systems 106, based on a comparison between the received first time-period, the second time-period, and the determined current time of day.

The electric charge management device 102 may be configured to determine the first time-period and the second time-period based on past information associated with the user 116 and the first vehicle 104A. The past information may indicate a first timing pattern of the first vehicle 104A over a period of time (e.g., in last "1 month") to transfer the electric energy or to charge the battery 120. The past information may also indicate a second timing pattern (over the period of time) to initiate transfer of the electric energy or charge the battery 120 based on an input through the UI 118.

The electric charge management device 102 may be further configured to generate recommendation information, which indicates the determined first time-period and the second time-period, for the user 116. The electric charge management device 102 may be configured to control display of the generated recommendation information to the user 116 based on a motion state of the first vehicle 104A. Thus, the determination of the motion state may avoid a situation where the user 116 of the first vehicle 104A may be interrupted or distracted with the displayed recommendation information.

The generated recommendation information may also indicate a location of at least one of the plurality of electric power systems 106 to which the excess energy amount is to be transferred. The generated recommendation information may also include map information to reach from a current position of the first vehicle 104A to a location of a nearest electric power system of the plurality of electric power systems 106. The recommendation of the map information and the location of the nearest electric power system by the electric charge management device 102, may assist the user 116 to park the first vehicle 104A in vicinity of the identified nearest electric power system for the energy transfer.

Figure 2:
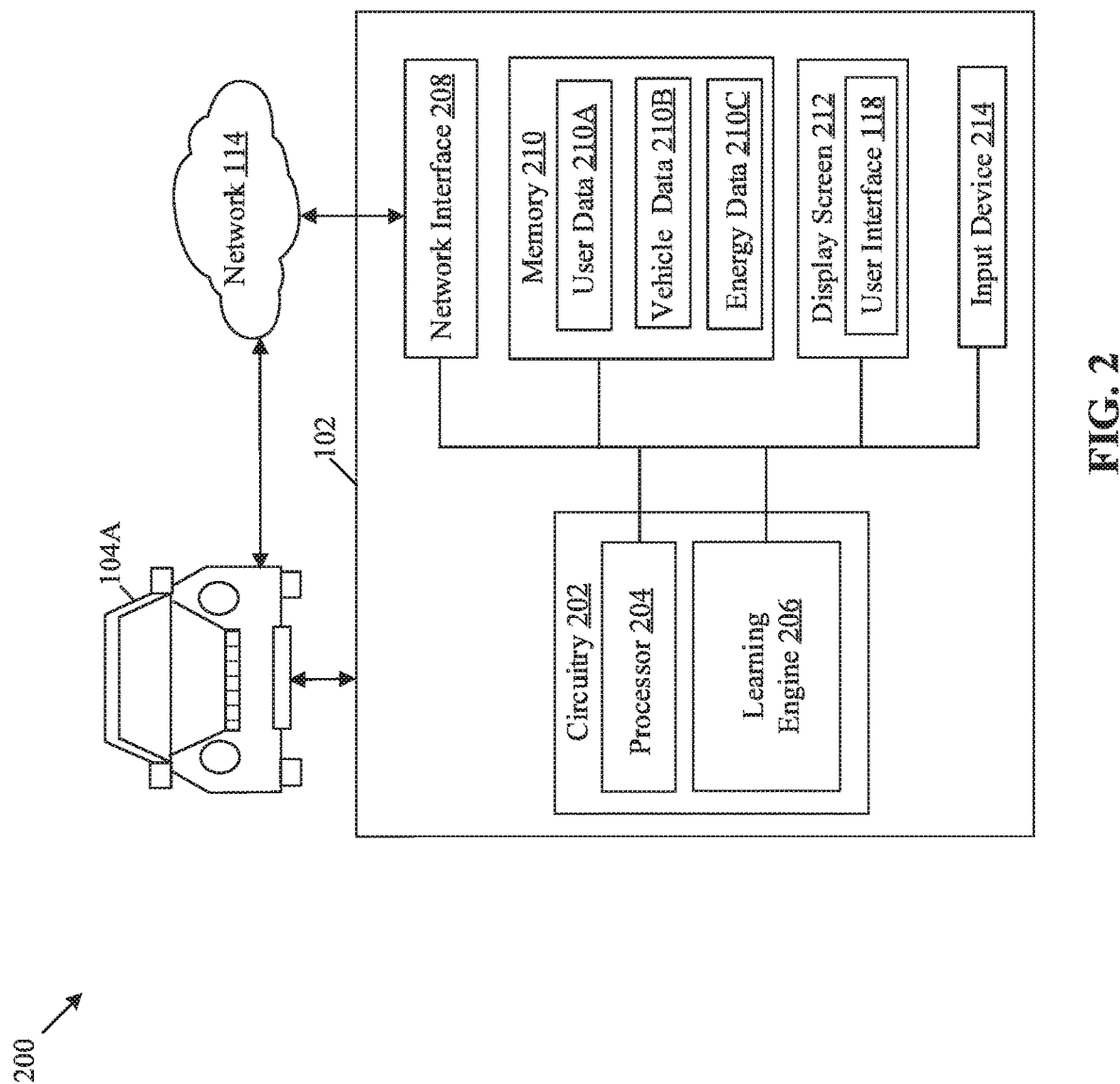
FIG. 2 is a block diagram that illustrates an exemplary electric charge management device, in accordance with an embodiment of the disclosure.

FIG. 2 is a block diagram that illustrates an exemplary electric charge management device, in accordance with an embodiment of the disclosure. FIG. 2 has been explained in conjunction with FIG. 1. With reference to FIG. 2, there is shown a block diagram 200 of the electric charge management device 102. The electric charge management device 102 may include circuitry 202, which may include a processor 204, and a learning engine 206. The electric charge management device 102 may further include a network interface 208, a memory 210, a display screen 212, and an input device 214. The circuitry 202 may be communicatively coupled with the network interface 208, the memory 210, the display screen 212, and the input device 214, via a set of communication ports/channels. There is also shown the first vehicle 104A which is associated with the electric charge management device 102. In some embodiments, the electric charge management device 102 may be integrated into the first vehicle 104A.

The processor 204 may comprise suitable logic, circuitry, interfaces, and/or code that may be configured to execute a set of instructions stored in the memory 210. The processor 204 may be configured to process one or more user inputs and information associated with the user 116 or the first vehicle 104A. The processor 204 may be further configured to communicate with the first vehicle 104A through the network interface 208. The processor 204 may be implemented based on a number of processor technologies known in the art. Examples of the processor 204 may include a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor, and/or other hardware processors.

The learning engine 206 may comprise suitable logic, circuitry, interfaces, and/or code that may be configured to train a learning model on past information related to the first vehicle 104A and the user 116. In some embodiments, the learning engine 206 may be configured to predict different information, which may be used to compute different threshold values for charge management. Examples of such predicted information may include, but are not limited to the driving pattern of the user 116, the plurality of operations of the first vehicle 104A, energy consumption of the battery 120 to perform one or more of the plurality of operations, future travel information of the first vehicle 104A, calendar information related to the user 116, user-preference information of the user 116, and the charging-discharging information of the battery 120. The learning engine 206 may be further configured to compute the first energy cost of the excess energy amount expendable by the battery 120 of the first vehicle 104A based on the past information and/or the predicted information. Examples of implementation of the learning engine 206 may include, but are not limited to, a deep learning engine, an artificial intelligence (AI)-based learning engine, rule based learning engine, an artificial neural network based engine, support vector machines based engine, or other machine learning engine.

The network interface 208 may comprise suitable logic, circuitry, interfaces, and/or code that may be configured to enable communication between the electric charge management device 102, the plurality of vehicles 104A, 1046, 104C, ..., 104N, the electric grid 110, and the server 112, via the network 114. The network interface 208 may be configured to communicate control signals to the first vehicle 104A for different operations related to the first vehicle 104A and the battery 120 of the first vehicle 104A. The network interface 208 may implement by use of various known technologies to support wired or wireless communication of the electric charge management device 102 with the network 114. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with the networks 114. The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The memory 210 may comprise suitable logic, circuitry, interfaces and/or code that may be operable to store a set of instructions executable by the processor 204 and the learning engine 206. The memory 210 may store various types of information related to the plurality of vehicles 104A, 104B, 104C, ..., 104N, the user 116, the electric grid 110, and the plurality of charging stations 108A and 108B. The memory 210 may be further configured to store a training database. The learning engine 206 may be trained based on the stored training database which may include the user data 210A, the vehicle data 210B, and the energy data 210C. Examples of implementation of the memory 210 may include, but are not limited to, Random Access Memory (RAM), Read Only Memory (ROM), Hard Disk Drive (HDD), a Solid-State Drive (SSD), a CPU cache, and/or a Secure Digital (SD) card.

Various types of information may include, but are not limited to, user data 210A of the user 116, vehicle data 210B of the plurality of vehicles 104A to 104N, and energy data 210C related to the electric grid 110 and the plurality of charging stations 108A and 108B. Examples of the user data 210A may include, but are not limited to user identification information, user employer information, the user-preference information, user driving pattern information, and/or user calendar information of one or more users, such as the user 116. Examples of the vehicle data 210B may include, but are not limited to, the vehicle identification information, vehicle manufacturer information, the battery information, information related to different parts and functionalities of the plurality of vehicles 104A, 104B, 104C, ..., 104N, information related one or more sensors in the plurality of vehicles 104A, 104B, 104C, ..., 104N, $CO_2$ saving information, and/or navigation information. Examples of the energy data 210C may include, but are not limited to, current energy cost information, future energy cost information, and/or location information of the electric grid 110 and the plurality of charging stations 108A and 1086. The future energy cost information may include a predicted energy cost of the electric energy in the electric grid 110, at a particular time-period and a particular location.

The display screen 212 may comprise suitable logic, circuitry, interfaces and/or code that may be configured to render various types of information to the user 116. The display screen 212 may present a UI 118, which may include a plurality of data items and a plurality of UI elements, as discussed in FIG. 1. Examples of implementation of the display screen 212 may include, but are not limited to a liquid crystal display (LCD) screen, and a light emitting diode (LED) screen, a plasma display, and an Organic LED (OLED) display, and other displays.

The input device 214 may comprise suitable logic, circuitry, interfaces, and/or code that may be configured to receive a plurality of inputs from the user 116. The input device 214 may be further configured to provide the received plurality of inputs to the processor 204. Examples of the input devices may include, but not limited to, a touch screen, a touch pad, a keyboard, a mouse, a joystick, a microphone, and/or an image sensor.

Figure 3:
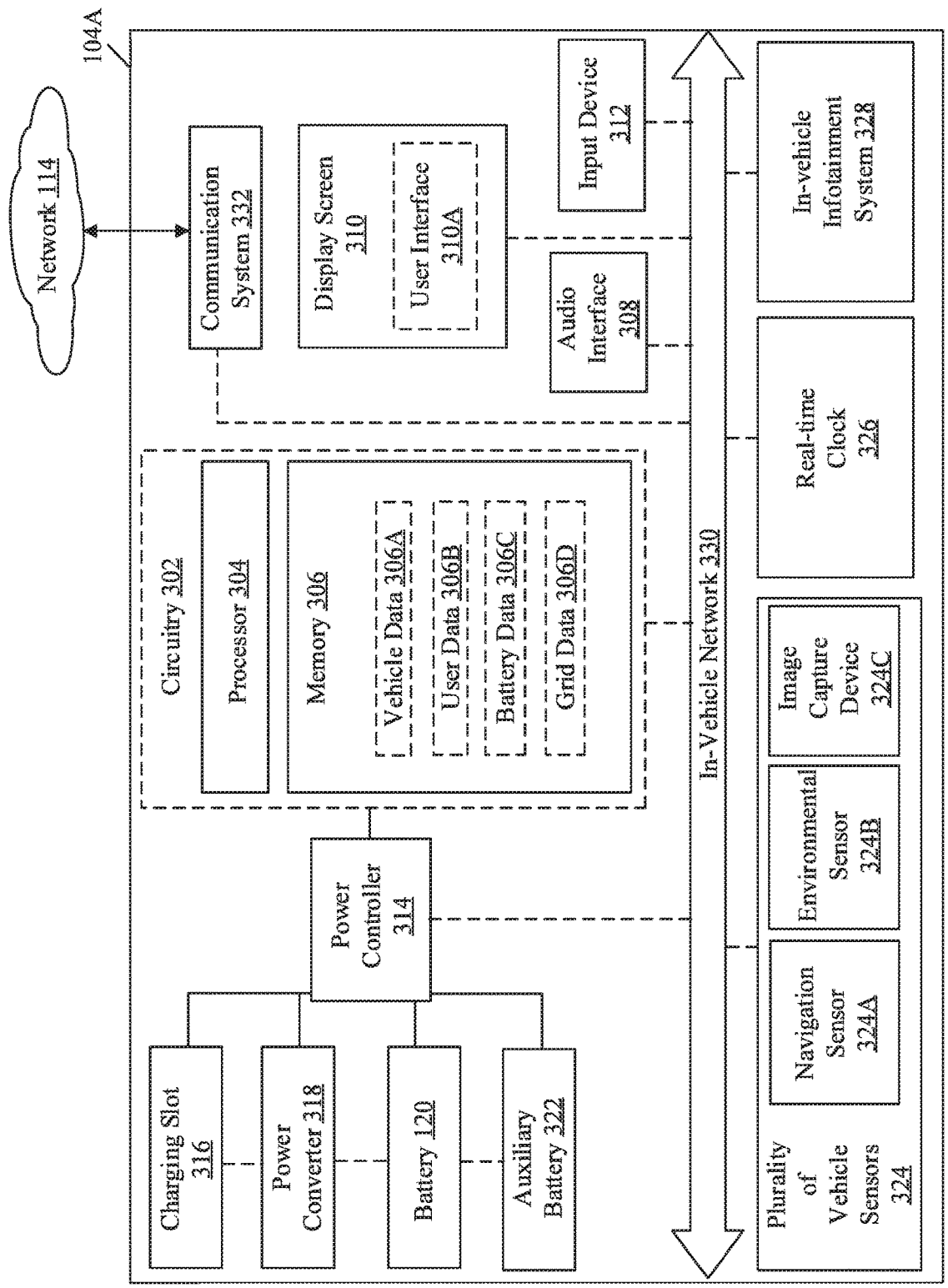
FIG. 3 is a block diagram that illustrates an exemplary vehicle that includes the electric charge management device of FIG. 2, in accordance with an embodiment of the disclosure.

FIG. 3 is a block diagram that illustrates an exemplary vehicle that includes the electric charge management device of FIG. 2, in accordance with an embodiment of the disclosure. FIG. 3 has been explained in conjunction with FIG. 1 and FIG. 2. With reference to FIG. 3, there is shown the first vehicle 104A which may include a circuitry 302 which may include a processor 304, and a memory 306. The first vehicle 104A may further include an audio interface, a display screen 310, an input device 312, a power controller 314, a charging slot 316, a power converter 318, a battery 120, an auxiliary battery 322, a plurality of vehicle sensors 324, a real-time clock 326, an in-vehicle infotainment system 328, an in-vehicle network 330, and a communication system 332. The first vehicle 104A may include the electric charge management device 102.

The processor 304 may comprise suitable logic, circuitry, interfaces, and/or code that may be configured to execute a set of instructions stored in the memory 306. The processor 304 may be configured to control one or more components or systems of the first vehicle 104A, such as the display screen 310, the input device 312, the power controller 314, the charging slot 316, the power converter 318, the battery 120, the auxiliary battery 322, the plurality of vehicle sensors 324, and the communication system 332. The processor 304 may execute different functions similar to the processor 204 described in FIG. 2.

The memory 306 may comprise suitable logic, circuitry, interfaces and/or code that may be configured to store a set of instructions executable by the processor 304. The memory 210 may store various types of information related to the first vehicle 104A, the user 116, the electric grid 110, the plurality of charging stations 108A and 1086. Various type of information may include, but are not limited to, vehicle data 306A, user data 306B, battery data 306C, and grid data 306D. Examples of the vehicle data 306A and the user data 306B are similar to details mentioned in FIG. 2. Examples of the battery data 306C may include, but are not limited to, battery manufacturer information, battery manufacturing date, battery capacity information, and charging-discharging information of the battery 120. The grid data 306D may include information related to the electric grid 110. Examples of such information related to the electric grid 110 may include, but are not limited to, location information of the electric grid 110 and the plurality of charging stations 108A and 108B, cost information of the electric energy available at the electric grid 110 or the plurality of charging stations 108A and 108B. The memory 306 may execute different functions similar to the memory 210 described in FIG. 2.

The audio interface 308 may comprise suitable logic, circuitry, interfaces, and/or code that may be configured to input audio data from the user 116 or output audio data to the user 116. The audio interface 308 may also be connected to a microphone to receive the one or more user inputs (e.g., a voice instruction) from the user 116. The audio interface may be connected to a speaker to produce an audio output for the user 116. The audio interface 308 may also be communicatively coupled to the circuitry 302.

The display screen 310 may comprise suitable logic, circuitry, interfaces, and/or code that may be configured to render various types of information to the user 116. The display screen 310 may present a user interface 310A, which may include the plurality of data items and the plurality of UI elements, as discussed in FIG. 1. Examples of implementations of the display screen 310 may include a liquid crystal display (LCD), and a light emitting diode (LED) display, a plasma display, and an Organic LED (OLED) display, and other displays.

The input device 312 may comprise suitable logic, circuitry, interfaces, and/or code that may be configured to receive a plurality of user inputs from the user 116. The input device 312 may further configured to provide the received plurality of inputs to the processor 304 to further control the plurality of operations of the first vehicle 104A. Examples of the plurality of user inputs may include, but are not limited to, a voice input, a gesture input, a touch input, and a text input. Examples of the input device 312 may include, but are not limited to, a touchscreen interface, a touch pad, a keyboard, a microphone, a camera, and a computer mouse.

The power controller 314 may comprise suitable logic, circuitry, interfaces, and/or code that may be configured to receive control signals from the processor 304 to control the charging slot 316, the power converter 318, the battery 120, and the auxiliary battery 322. The power controller 314 may be configured to control the charging and the discharging of the battery 120 and the auxiliary battery 322 based on the received control signals. The power controller 314 may be configured to control the transfer of the electric energy between the battery 120 (or the auxiliary battery 322) and the plurality of electric power systems 106, via the charging slot 316, based on the received control signals. In some embodiments, the power controller 314 may regulate a charging rate of the electric energy transfer between the battery 120 (or auxiliary battery 322) and the plurality of electric power systems 106. In some embodiments, the power controller 314 may be configured to provide energy monitoring and safety functionalities while controlling the charging/discharging of the battery 120 (or the auxiliary battery 322). Examples of the power controller may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other energy-control hardware processors.

The charging slot 316 may comprise suitable logic, circuitry, interfaces, and/or code that may be configured to physically connect the first vehicle 104A to one of the plurality of electric power systems 106 (e.g., an electric vehicle in vicinity of the first vehicle 104A) for the transfer of the electric energy, via a charging cable. The charging slot 316 may connect to a charging pin or a charging slot of one of the plurality of charging stations 108A and 108B via the charging cable. The charging slot 316 may include two or more electric pins for transfer of the electric energy. In some embodiments, the charging slot 316 may also include at least one data pin for transfer of data or control signals between the electric charge management device 102 and the plurality of electric power systems 106. Examples of the charging slot 316 may include, but are not limited to, a standard electrical outlet, an electric charge port, a SAE J1772 charging port, or other multiple pins electric charging slots.

The power converter 318 may comprise suitable logic, circuitry, interfaces, and/or code that may be configured to convert electric power received from the plurality of electric power systems 106 or the electric power transferred from the battery 120 (or the auxiliary battery 322), via the charging slot 316. The power converter may be configured to convert alternating current (AC) power received at the charging slot 316 to direct current (DC) power. In some embodiments, the power converter 318 may be configured to convert the DC power into the AC power. In some embodiments, the power converter 318 may be configured to step-up or step-down the electric power based on one or more control signals received from the power controller 314.

The power converter 318 may be configured to supply the electric power to different electrical components of the first vehicle 104A based on the one or more control signals received from the power controller 314. Examples of the power converter 318 may include, but are not limited to, an electric power inverter, an electric power converter, a uni-directional power converter, a bidirectional converter, a buck/boost converter, an energy phase converter, a sine wave power converter, a square wave power converter, and other power converter, known in the art. In accordance with an embodiment, a combination of the power controller 314, the charging slot 316, and the power converter 318 may be configured to charge the battery 120 and the auxiliary battery 322.

The battery 120 and the auxiliary battery 322 may be a source of electric power for one or more electric circuits, components, or loads of the first vehicle 104A. The battery 120 and the auxiliary battery 322 may be a rechargeable battery. The battery 120 and the auxiliary battery 322 may be the source of electric power to the electric charge management device 102 associated with the first vehicle 104A, the circuitry 302, the memory 306, the audio interface 308, the display screen 310, the input device 312, the power controller 314, the plurality of vehicle sensors 324, the real-time clock 326, the in-vehicle infotainment system 328, the communication system, and other hardware units of the first vehicle 104A. The battery 120 and the auxiliary battery 322 may be the source of electrical power to start an engine of the first vehicle 104A. In some embodiments, the battery 120 may correspond to a battery pack, which may have a plurality of clusters of batteries, which may be surrounded by a suitable coolant and a charge controller (not shown in FIG. 3). Examples of the battery 120 and the auxiliary battery 322 may include, but are not limited to, a lead acid battery, a nickel cadmium battery, a nickel-metal hydride battery, a lithium ion battery, and other rechargeable batteries.

The plurality of vehicle sensors 324 may comprise suitable logic, circuitry, interfaces, and/or code that may be configured to acquire one or more data parameters, such as a user occupancy in the first vehicle 104A, ambient temperature around the battery of the first vehicle 104A, and a current SOC of the battery. The plurality of vehicle sensors 324 may be communicatively coupled to the processor 304, to transmit the one or more data parameters to the processor 304, for the setting of a first threshold value and a second threshold value of the battery 120. The plurality of vehicle sensors 324 may include a navigation sensor 324A, an environmental sensor 324B, and an image sensing device 324C.

The navigation sensor 324A may include suitable logic, circuitry, interfaces, and/or code which may be configured to capture the navigational information, which may include a location or a position of the first vehicle 104A. Examples of the navigation sensor 324A may include a global positioning system (GPS) sensor, a Global Navigation Satellite System (GNSS)-based sensor, or other regional navigation systems or sensors.

The environmental sensor 324B may include suitable logic, circuitry, interfaces, and/or code that may be configured to capture environmental information (such as temperature, humidity, CO2, etc.) of a surrounding of the first vehicle 104A. The environmental sensor 324B may be configured to capture the environmental information around one or more components (such as battery 120) of the first vehicle 104A. Examples of the environmental sensor 324B may include, but are not limited to, a temperature sensor, a humidity sensor, a $CO_2$ sensor, a PM2.5 sensor, wind speed/direction sensor, a sound sensor, and other environmental sensors.

The image sensing device 324C may include suitable logic, circuitry, interfaces, and/or code which may be configured to capture one or more images of occupants (such as user 116) of the first vehicle 104A. The image sensing device 324C may be configured to provide the one or more captured images to the processor 304 for the identification of the occupants in the first vehicle 104A. Examples of the image sensing device 324C may include, but are not limited to, a camera, an image sensor, a closed-circuit television (CCTV) camera, a camcorder, a time-of-flight camera (TOF camera), a night-vision camera, and/or other such in-vehicle cameras or sensors.

The real-time clock 326 may comprise suitable logic, circuitry, interfaces, and/or code that may be configured to determine a current date-time of a current geo location of the first vehicle 104A. Examples of the real-time clock 326 may include, but are not limited to, a crystal-based clock, a computer clock, and a radio-based clock.

The in-vehicle infotainment system 328 may comprise suitable logic, circuitry, interfaces and/or code that may be configured to present at least an audio-based data, a video-based data and a user interface of the first vehicle 104A. The in-vehicle infotainment system 328 may execute one or more of the plurality of operations based on which the second threshold value may be computed. Examples of the in-vehicle infotainment system 328 may include, but are not limited, an entertainment system, a navigation system, a vehicle user interface (UI) system, an Internet-enabled communication system, and other entertainment systems.

The in-vehicle network 330 may include a medium through which the circuitry 302 may communicate with other components of the first vehicle 104A (such as the display screen 310, the input device 312, the power controller 314, the plurality of vehicle sensors 324, and the communication system 332). Various devices or components in the first vehicle 104A may be configured to connect to the in-vehicle network 330, in accordance with various wired and wireless communication protocols. Examples of the wired and wireless communication protocols for the in-vehicle network 330 may include, but are not limited to, a vehicle area network (VAN), a CAN bus, Domestic Digital Bus (D2B), a Transmission Control Protocol and Internet Protocol (TCP/IP), Bluetooth (BT) communication protocol, Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The communication system 332 may comprise suitable logic, circuitry, interfaces and/or code that may be configured to communicate data associated with the first vehicle 104A with the plurality of electric power systems 106, the server 112, and the electric home appliance, through the network 114. The communication system 332 may be implemented by use of various known technologies to support wired or wireless communication of the first vehicle 104A with the network 114. The communication system 332 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer.

Figure 4A:
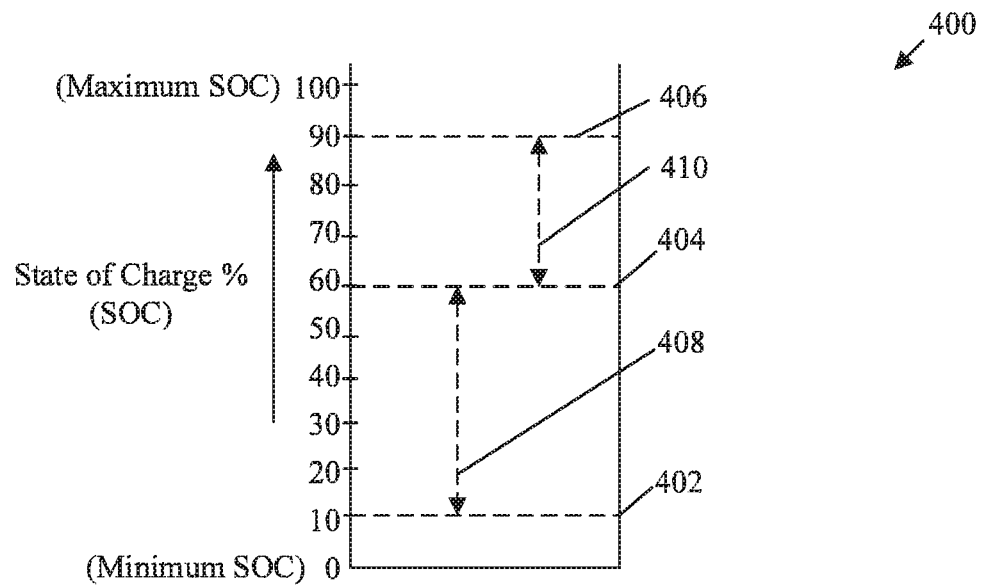
FIG. 4A illustrates battery charge level information of a vehicle battery, in accordance with an embodiment of the disclosure.
Figure 4B:
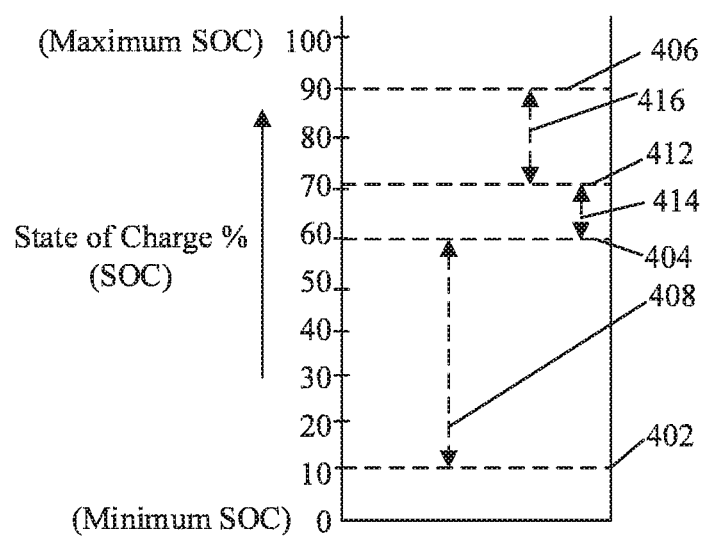
FIG. 4B illustrates battery charge level information of a vehicle battery, in accordance with an alternative embodiment of the disclosure.

FIG. 4A illustrates battery charge level information of a vehicle battery, in accordance with an embodiment of the disclosure. FIG. 4A and FIG. 4B has been explained in conjunction with FIGS. 1, 2, and 3. With reference to FIG. 4A, there is shown a battery representation which illustrates the state-of-charge (SOC) of the battery 120 of the first vehicle 104A. The battery representation 400 may illustrate different charge or discharge levels of the battery 120 from a zero SOC (0%) to a maximum SOC (100%). The maximum SOC (100%) may indicate that the battery 120 is completely charged with the electric energy. The maximum SOC (100%) may also indicate a maximum energy amount that can be stored by the battery 120. The maximum SOC (100%) may be based on the environmental information captured by the environmental sensor 324B. The minimum SOC (0%) may indicate that the battery 120 is completely discharged with no electric energy stored. The power controller 314 of the first vehicle 104A may be configured to control the depletion of the electric energy from the battery beyond the minimum SOC (0%).

The battery representation 400 further illustrates a first discharge level 402 of the battery 120 and a second discharge level 404 of the battery 120. The first discharge level 402 may be greater than the minimum SOC (%) of the battery. The first discharge level 402 may correspond to a lower ceiling on the SOC (in % or Ah) of the battery 120. In case, the current SOC of the battery 120 reaches the first discharge level 402, the electric charge management device 102 may be configured to prevent further discharge of the battery 120 and restrict the plurality of operations of the first vehicle 104A and sharing of battery's energy with the plurality of electric power systems 106.

The battery representation 400 further illustrates the current SOC 406 (of the battery 120 of the first vehicle 104A), which may be determined by the circuitry 202, as discussed in FIG. 1. A first energy difference amount 408 between the first discharge level 402 and the second discharge level 404 may indicate the first energy amount. The first energy amount may indicate the electric energy of the battery 120, which may be required by the first vehicle 104A to execute one or more of the plurality of operations of the first vehicle 104A, as discussed in FIG. 1. A second energy difference amount 410 between the current SOC 406 and the second discharge level 404 may indicate the second energy amount (as excess or surplus energy amount) which may be transferred to the one or more of the plurality of electric power systems 106, as discussed in FIG. 1.

The first discharge level 402 and the second discharge level 404 of the battery 120 may correspond to the first threshold value and the second threshold value received from the user 116 via the UI 118. The receipt of the first threshold value and the second threshold value via the UI 118, is described in detail, for example in FIG. 5. For example, the first threshold value and the second threshold value may indicate an ASCII or numeric value input by the user 116 via the UI 118. Further, the first discharge level 402 and the second discharge level 404 may indicate different SOC level of the battery 120 in one of Ampere-hour (Ah), % of SOC, Kilowatt Hour (KWh), megajoule (MJ), or in volts (V) as per the current capacity of the battery 120. For example, a value of "10" entered by the user 116, via the UI 118, for the first threshold value may correspond to certain volts (or Ampere-hour (Ah), % of SOC, Kilowatt Hour (KWh), or megajoule (MJ)) of the first discharge level 402 based on the capacity of the battery 120. The electric charge management device 102 facilitates the user 116 to enter the first threshold value and the second threshold value through the UI 118 and further set the first discharge level 402 and the second discharge level 404 of the battery 120 based on the entered first threshold value and the second threshold value by the user 116. Thus, the electric charge management device 102 allows the user 116 to set different discharge levels of the battery and ensures effective battery management by the user 116.

FIG. 4B illustrates battery charge level information of a vehicle battery, in accordance with an alternative embodiment of the disclosure. In FIG. 4B, the circuitry 202 of the electric charge management device 102 may be configured to set a third threshold value or a third discharge level 412 of the battery 120. The third discharge level 412 may be higher than the second discharge level 404. A third energy difference amount 414 between the third discharge level 412 and the second discharge level 404 may indicate a third energy amount of the battery 120. The third energy amount may be a margin energy amount (of the battery 120) which may be required by the first vehicle 104A to execute one or more of the plurality of operations associated with the first vehicle 104A. In such case, an energy difference amount 416 between the current SOC 406 and the third discharge level 412 may indicate the second energy amount (the excess energy amount, which may be sold (or transferred) to one of the plurality of external electric power system, as discussed in FIG. 1.

In operation, the electric charge management device 102 (or the processor 304 in the first vehicle 104A) may be configured to automatically set the third threshold value for the third discharge level 412 based on the set second threshold value for the second discharge level 404. In some embodiments, the electric charge management device 102 (or the processor 304 in the first vehicle 104A) may be configured to control the transfer of the electric energy (from the battery 120 to one of the plurality of electric power systems 106) between the current SOC and the third discharge level 412.

In the energy transfer phase, the electric charge management device 102 (or the processor 304 in the first vehicle 104A) may be configured to limit a depletion of the electric energy from the battery 120 to the third discharge level 412. Thus, after the energy transfer, the battery 120 is left with the margin energy amount between the third discharge level 412 and the second discharge level 404 to execute one or more of the plurality of operations of the first vehicle 104A. The automatic setting of the third threshold value for the third discharge level 412 by the electric charge management device 102 (or the processor 304) ensures that the first vehicle 104A is left with the margin energy amount for routine (or usual) operations of the first vehicle 104A, after the completion of the energy transfer between the first vehicle 104A and one of the plurality of electric power systems 106.

Figure 5:
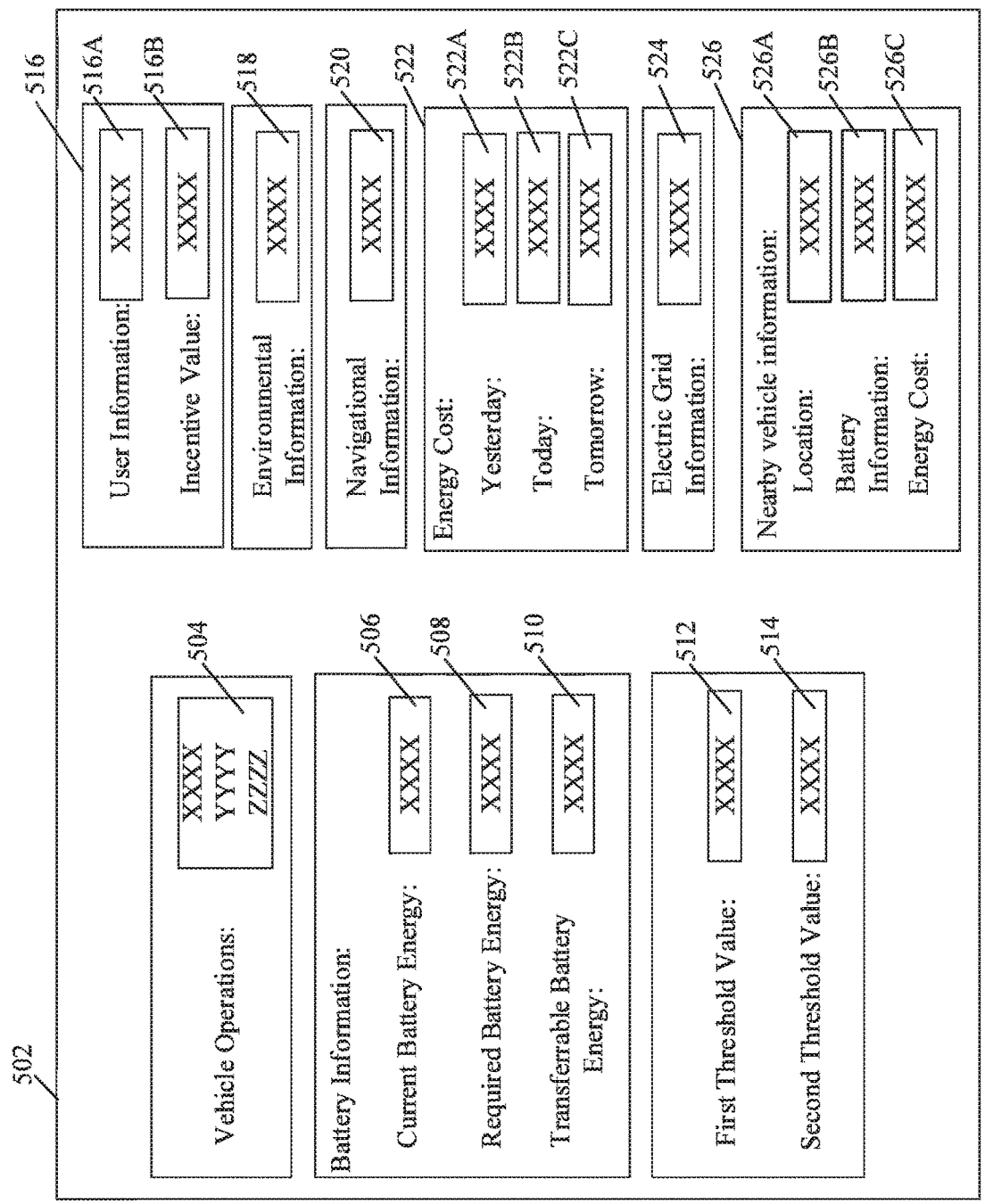
FIG. 5 illustrates an exemplary user interface of the electric charge management device of FIG. 2, for a vehicle-to-grid energy transfer, in accordance with an embodiment of the disclosure.

FIG. 5 illustrates an exemplary user interface of the electric charge management device of FIG. 2, for a vehicle-to-grid energy transfer, in accordance with an embodiment of the disclosure. FIG. 5 has been explained in conjunction with FIGS. 1, 2, 3, 4A, and 4B. With reference to FIG. 5, there is shown a user interface 502, which may be presented to the user 116 by the electric charge management device 102, via the display screen 212, as discussed in FIG. 1.

The user interface 502 may include a plurality of UI elements, for example, UI elements 504 to 526. The first UI element 504 may render information associated with one or more of the plurality of operations selected by the user 116 or handled by the first vehicle 104A. In some embodiments, the user 116 may select one or more of the plurality of operations through the first UI element 504. Examples of the plurality of operations may include, but are not limited to a travel operation of the first vehicle 104A from the starting point to the destination point, the Heating, Ventilation, and Air Conditioning (HVAC) operation, the entertainment operation, the lighting operation, the sensing operation, the vehicle configuration operation, or the propulsion operation. The first UI element 504 may render the information of the plurality of operations that may be executed at a current time by the first vehicle 104A. In some embodiments, the first UI elements may render the information of the plurality of operations that may change in load on the battery, which may result in a change in consumption of the electric energy from the battery 120 at the current time.

The second UI element 506 may render information associated with the current SOC of the battery 120. In some embodiments, the second UI element may render the remaining electric energy of the battery 120. The third UI element 508 may render information associated with the first energy amount, which may be required by the first vehicle 104A to handle one or more of the plurality of operations. The fourth UI element 510 may render information associated with the excess energy amount (in the battery 120), which may be sold (or transferred) to one of the plurality of electric power systems 106, as discussed in FIG. 1. The fifth UI element 512 may render information associated with the first threshold value set by the electric charge management device 102, as discussed in FIG. 1. The sixth UI element 514 may render information associated with the second threshold value set by the electric charge management device 102, as discussed in FIG. 1. In some embodiments, the electric charge management device 102 may be configured to receive the first threshold value and the second threshold value from the user 116, through fifth UI element 512 and the sixth UI element 514, respectively.

The seventh UI element 516 may render information associated with the user 116. The seventh UI element 516 may include a UI element 516A and an incentive value UI element 516B. The UI element 516A may render the user identification information. Examples of the user identification information may include, but are not limited to, a name of the user 116, an address of the user 116, a unique user ID, or a social security number (SSN) of the user 116. The incentive value UI element 516B may include an incentive value associated with the user 116.

The incentive value may be transferred to the user 116 when the electric energy is transferred from the battery 120 of the first vehicle 104A to one or more of, the electric grid 110 or the first set of vehicles 104B to 104N. The user 116 may receive the incentive value from an employer of the user 116, a governmental or private entity or a manufacturer of the first vehicle 104A. In some embodiments, the electric charge management device 102 may be configured to update the incentive value for the user 116, based on a total energy amount sold by the user 116. In some embodiments, the server 112 may be configured to update and store the incentive value for the user 116. An example of an update of the incentive value, is described in detail, in FIG. 8.

The eighth UI element 518 may render information associated with ambient environment of the first vehicle 104A to the user 116. The information associated with the environment may include, but is not limited to current temperature information, current humidity information, current air quality information, current wind condition information, $CO_2$ information, and other weather information. The information associated with the ambient environment may be captured by the environmental sensor 324B of the first vehicle 104A. In accordance with an embodiment, variations in certain environmental parameters (such as temperature) may affect the capacity and charge efficiency of the battery 120. Such environmental parameters may further affect calculation of the SOC of battery 120. Thus, capability of the electric charge management device 102 to render the information associated with the ambient environment of the first vehicle 104A may ensure that an accurate first threshold value and the second threshold value are set, in response to a user input, via the fifth UI element 512 and the sixth UI element 514, respectively.

The ninth UI element 520 may render the navigational information associated with the first vehicle 104A. The navigation information may be captured by the navigation sensor 324A of the first vehicle 104A. Examples of the navigational information associated with the first vehicle 104A may include location information associated with the starting point and the destination point of current travel of the first vehicle 104A, map information between a starting point and a destination point, and current location information of the first vehicle 104A.

The tenth UI element 522 may render information associated with a cost of the electric energy. The cost of the electric energy may include a price (at a consumer level or an enterprise level) of one unit (kilowatt hour) of the electrical energy in the electric grid 110 at the location of the electric charge management device 102 or the first vehicle 104A. The tenth UI element 522 may further include a yesterday energy cost UI element 522A, a today energy cost UI element 522B, and a tomorrow energy cost UI element 522C. The today energy cost UI element 522B may render information associated with a price of one unit of electric energy in the electric grid 110, on a current day at a current location or the location of the first vehicle 104A. The yesterday energy cost UI element 522A may include information associated with a price of the one unit of electric energy in the electric grid 110, on a day before the current day (i.e. yesterday). The tomorrow energy cost UI element 522C may include information associated with a price of the one unit of electric energy in the electric grid 110, on a day after the current day (i.e. tomorrow). The ability of the electric charge management device 102 to render the cost of the electric energy of the current day in relation with yesterday's cost (a past day cost) and tomorrow's cost (or a future cost) may assist the user 116 or the plurality of electric power systems 106 to determine a suitable date or time when to charge the battery 120 (or the auxiliary battery 322) from the electric grid 110 or when to transfer the electric energy stored in the battery (or the auxiliary battery 322) to the electric grid 110.

The eleventh UI element 524 may render information associated with the electric grid 110. The information associated with the electric grid 110 may include locations of the plurality of charging stations 108A and 1086 of the electric grid 110. The eleventh UI element 524 may also render details of the electric grid 110 (or the plurality of charging stations 108A and 108B), to which the first vehicle 104A may transfer the electric energy in real time. The details of the electric grid 110 (or the plurality of charging stations 108A and 108B) may include, but are not limited to, a name of a governing entity of the electric grid 110, a technical specification of the plurality of charging stations 108A and 1086, and one or more nearby charging stations.

The twelfth UI element 526 may render information related to one or more vehicles of the first set of vehicles 1046 to 104N in vicinity of the first vehicle 104A. The twelfth UI element 526 may include a location UI element 526A, a battery information UI element 526B, and an energy cost UI element 526C. The location UI element 526A may render location information associated with the one or more vehicles, which may be located within a threshold distance (such as a parking area) of the first vehicle 104A. The location information associated with the one or more vehicles may include a distance or the map information between the respective one or more vehicles and the first vehicle 104A of the user 116.

The battery information UI element 526B may render battery information associated with the one or more vehicles. The battery information may include information associated with a current SOC of a battery of the respective one or more vehicles. The energy cost UI element 526C may render energy cost information associated with the one or more vehicles. The energy cost information associated with the one or more vehicles may include information associated with a first price at which the respective one or more vehicles may want to sell the electric energy to the first vehicle 104A. The information may further include a second price at which the respective one or more vehicles may want to purchase the electric energy from the first vehicle 104A.

Figure 6:
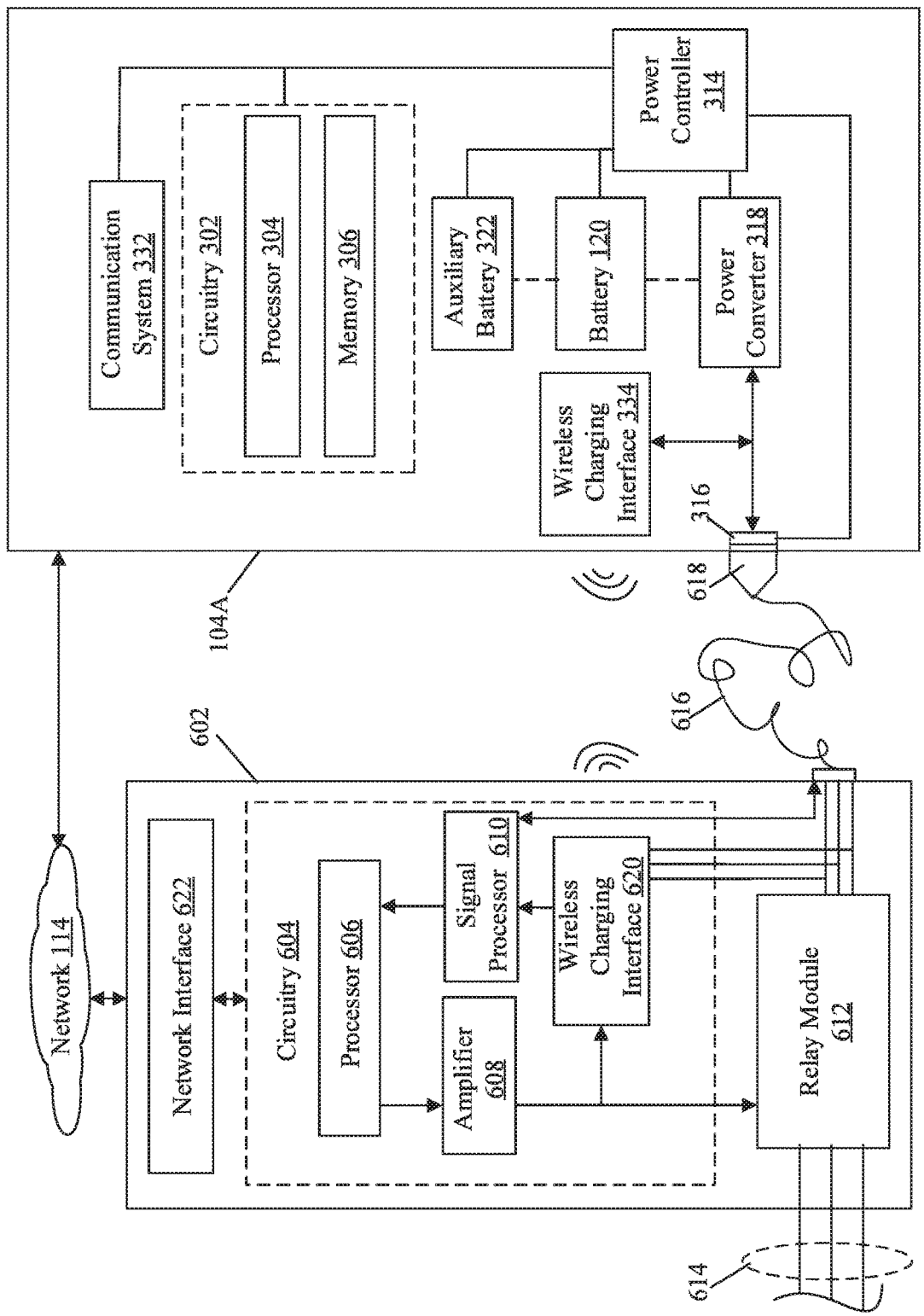
FIG. 6 illustrates an exemplary charging station for a vehicle-to-grid energy transfer, in accordance with an embodiment of the disclosure.

FIG. 6 illustrates an exemplary charging station for a vehicle-to-grid energy transfer, in accordance with an embodiment of the disclosure. FIG. 6 has been explained in conjunction with FIGS. 1, 2, 3, 4A, 4B, and 5. FIG. 6 illustrates a charging station 602. The charging station 602 may be similar to one of the plurality of charging stations 108A and 108B, as described in FIG. 1. In FIG. 6, there is also shown the first vehicle 104A, as described in FIG. 3. The charging station 602 may include circuitry 604 which may include a processor 606, an amplifier 608, and a signal processor 610. The charging station 602 may further include a relay module 612, a charging cable 616, a charging plug 618, a wireless charging interface 620, and a network interface 622. The relay module 612 may be electrically coupled to a power supply 614 of the electric grid 110 and the charging cable 616. A person of ordinary skill in the art will understand that the charging station 602 may also include other suitable components or systems, in addition to the components or systems that are illustrated herein to describe and explain the function and operation of the present disclosure.

The processor 606 may include suitable logic, circuitry, interfaces, and/or code that may be configured to control the relay module 612 to transfer the electric energy to the first vehicle 104A or receive the electric energy from the first vehicle 104A. The processor 606 may be configured to process one or more pilot signals received from the first vehicle 104A. Examples of the processor 606 may include, but are not limited to, a central processing unit (CPU), a microcontroller, an Application-Specific Integrated Circuit (ASIC) processor, a Complex Instruction Set Computing (CISC) processor, and/or other hardware processors. In accordance with an embodiment, some of functionalities of the processor 606 may be similar to functionalities associated with use of control signals and/or instructions by the power controller 314 and/or the processor 304, as described in FIG. 3.

The amplifier 608 may include suitable logic, circuitry, interfaces, and/or code that may be configured to receive a relay control signal from the processor 606. The amplifier 608 may be configured to amplify the relay control signal received from the processor 606. The amplifier 608 may be communicatively coupled to the relay module 612. Examples of the amplifier 608 may include, but are not limited to a relay driver circuit, a Darlington amplifier, and other signal amplifier circuits known in the art.

The signal processor 610 may include suitable logic, circuitry, interfaces, and/or code that may be configured to receive the one or more pilot signals from the first vehicle 104A, which may be electrically or wirelessly coupled with the charging station 602. The signal processor 610 may be configured to amplify the received one or more pilot signals and supply the amplified one or more pilot signals to the processor 606. The one or more pilot signals may be a control signal, i.e. a digital control signal or an analog control signal. Examples of the signal processor 610 may include, but are not limited to, a digital signal processor (DSP), an application-specific integrated circuit (ASIC), an analog to digital (ND) converter circuit, and other amplifier circuits.

The relay module 612 may include suitable logic, circuitry, interfaces and/or code that may be configured to connect or disconnect the power supply 614 with the charging cable 616 and the charging plug 618, based on the relay control signal received from the amplifier 608. The relay module 612 may be communicatively coupled to the processor 606, via various wired and wireless connection protocols. The relay module 612 may be in one of an "ON" state and an "OFF" state based on the relay control signal received from the processor 606, through the amplifier 608. In the "ON" state, the relay module 612 may be configured to electrically couple the power supply 614 with the charging cable 616 or the wireless charging interface 620. In the OFF state, the relay module 612 may be configured to electrically decouple the power supply 614 from the charging cable 616 and the wireless charging interface 620. The relay module 612 may be configured to electrically couple or decouple the power supply 614 with the wireless charging interface 620. The relay module 612 may act as an electric protection circuit between the electric grid 110 and the first vehicle 104A. Examples of the relay module 612 may include, but are not limited to, an electromagnetic relay, a solid-state relay, and other relay devices.

The charging cable 616 may be configured to electrically transfer the electric energy between the charging station 602 and the first vehicle 104A. Examples of the charging cable 616 may include, but are not limited, to a SAE J1772 charging cable, an unshielded twisted pair cable, a shielded twisted pair cable, and other charging cables known in the art. The charging plug 618 is an end-point of the charging cable 616. The charging plug 618 may be plugged into the charging slot 316 of the vehicle to transfer the electric energy between the charging station 602 and the first vehicle 104A. Examples of the charging plug 618 may include, but are not limited to, an international electro-technical commission (IEC) 62196 standard plug, a J1772 charging plug, and other type 1, type 2, and type 3 charging plugs.

The wireless charging interface 620 may include suitable logic, circuitry, interfaces, and/or code that may be configured to wirelessly transfer the electric energy from the charging station 602 to the first vehicle 104A. The wireless charging interface 620 may be configured to wirelessly receive the electric energy from the first vehicle 104A. Examples of the wireless interface 614 may include, but are not limited to, an electromagnetic coil, a wireless charging pad, and other wireless charging components. The first vehicle 104A may also include a wireless charging interface 334 (as shown in FIG. 6). The wireless charging interface 334 of the first vehicle 104A may handle different functions similar to the wireless charging interface 620 of the charging station 602.

The network interface 622 may comprise suitable logic, circuitry, interfaces, and/or code that may be configured to enable communication between the processor 606 of the charging station 602 and one of the electric charge management device 102, the plurality of vehicles 104A, 104B, 104C, . . . , 104N, and the electric grid 110, through the network 114. The network interface 622 may handle different functions similar to the network interface 208, as described in FIG. 2.

In operation, the circuitry 302 of the first vehicle 104A may be configured to determine the current SOC of the battery 120. The circuitry 302 may be configured to communicate a pilot signal to the charging station 602 based on the determined current SOC. The circuitry 302 of the first vehicle 104A may communicate the pilot signal, via the power controller 314 and the charging slot 316. In some embodiments, the circuitry 302 of the first vehicle 104A may wirelessly communicate the pilot signal via the wireless charging interface 334 of the first vehicle 104A and the wireless charging interface 620 of the charging station 602. In certain scenarios, the pilot signal may include a control instruction for the charging station 602 to initiate charging of the battery 120 of the first vehicle 104A. In other scenarios, the pilot signal may include the control instruction for the charging station 602 to de-couple the battery 120 of the first vehicle 104A from the power supply 614 of the electric grid 110. In some embodiments, the control instruction may cause the charging station 602 to initialize a transfer of the electric energy from the first vehicle 104A to the charging station 602.

The signal processor 610 may be configured to receive the pilot signal via the charging plug 618 and the charging cable 616. In some embodiments, the signal processor 610 may be configured to receive the pilot signal via the wireless charging interface 620. In some embodiments, the signal processor 610 (or the processor 606) may be configured to detect a plug-in state of the charging plug 618 into the charging slot 316 of the first vehicle 104A, based on the received pilot signal. The signal processor 610 may be configured to process the received pilot signal and amplify the received pilot signal. In some embodiments, the signal processor 610 may be configured to convert the received pilot signal into another form (such as analog-to-digital form). The signal processor 610 may be further configured to communicate the processed pilot signal to the processor 606.

The processor 606 may be configured to communicate a control signal to the relay module 612 through the amplifier 608, in response to the pilot signal received at the processor 606. In certain scenario, the processor 606 may be configured to control the relay module 612 to switch to the "ON" state, based on the control signal and the pilot signal. In the "ON" state, the relay module 612 may be configured to electrically couple the first vehicle 104A with the power supply 614 of the electric grid 110. In other scenarios, the processor 606 may be configured to control the relay module 612 to switch to the "OFF" state, based on the control signal and the pilot signal. In the "OFF" state, the relay module 612 may be configured to de-couple the first vehicle 104A from the power supply 614.

Figure 7A:
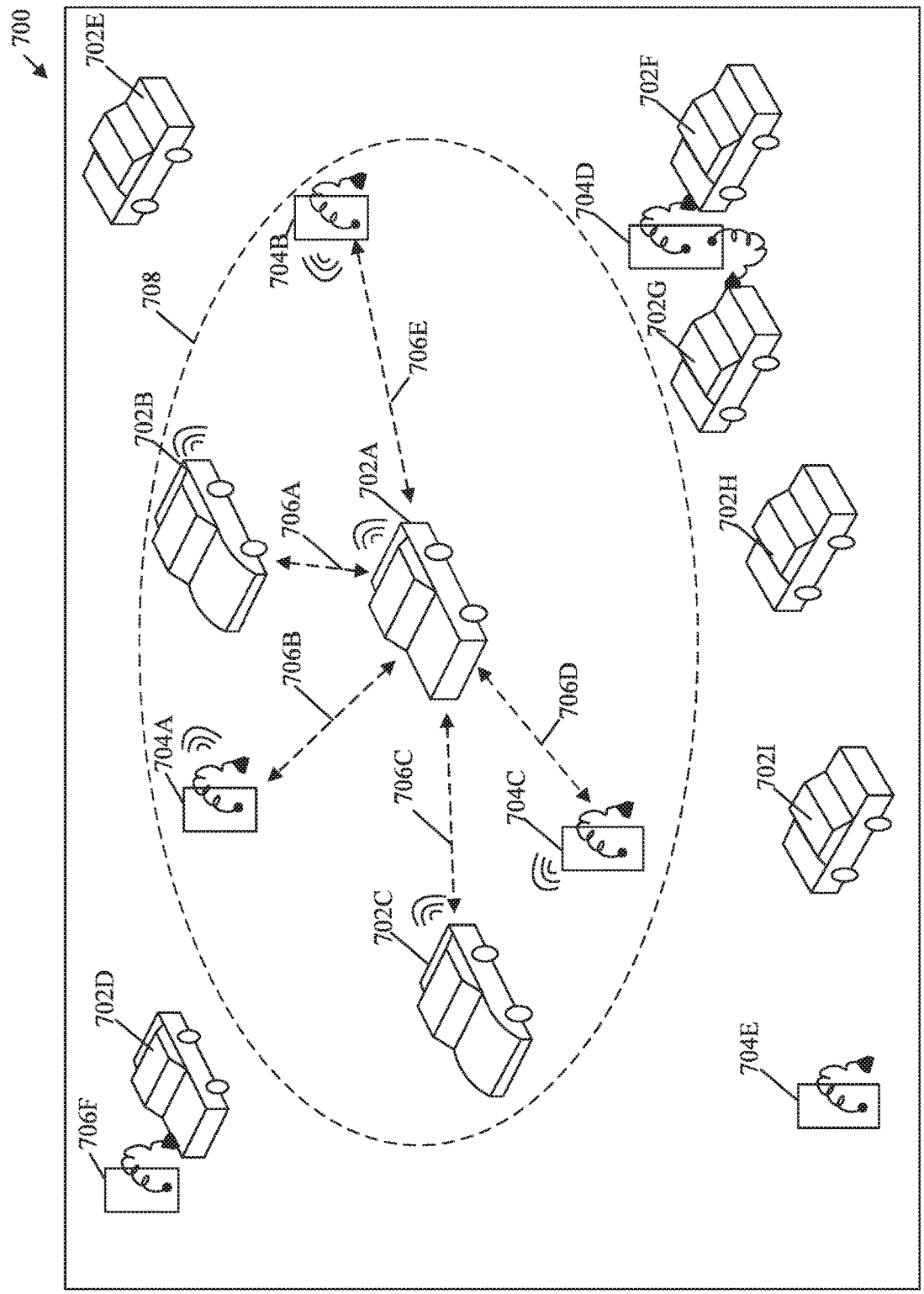
FIG. 7A illustrates an exemplary scenario for implementation of an electric charge management system for a vehicle-to-grid energy transfer, in accordance with an embodiment of the disclosure.

FIG. 7A illustrates an exemplary scenario for implementation of an electric charge management system for a vehicle-to-grid energy transfer, in accordance with an embodiment of the disclosure. FIG. 7A is explained in conjunction with elements from FIGS. 1, 2, 3, 4A, 4B, 5, and 6. With reference to FIG. 7A, there is shown a real-world environment 700 which may include a plurality of electric power systems 106. The plurality of electric power systems 106 may include a plurality of vehicles 702A to 702I and a plurality of charging stations 704A to 704F. A first vehicle 702A of the plurality of vehicles 702A to 702H may correspond to the first vehicle 104A of FIGS. 1 and 3. One or more of the plurality of vehicles 702A to 702I may include the electric charge management device 102. In accordance with an embodiment, one or more of the plurality of vehicles 702A to 702I may be a hybrid electric vehicle (HEV) and/or an electric vehicle (EV).

The first vehicle 702A may be configured to set a first threshold value for a first discharge level and a second threshold value for a second discharge level of a battery of the first vehicle 702A based on user inputs received from a user (such as the user 116 (FIG. 1)) of the first vehicle 702A. The first vehicle 702A may be configured to calculate an excess energy amount of the battery based on the received user inputs. The setting of the first threshold value and the second threshold value, and calculation of the excess energy amount, are described in detail, for example, in FIG. 1. The excess energy amount in the battery of the first vehicle 702A may be sold (or transferred) to one or more of the plurality of vehicles 702B to 702I and the plurality of charging stations 704A to 704F.

In certain scenarios, the first vehicle 702A may receive a user request to sell an energy amount (which may be stored in the battery of the first vehicle 702A), to one or more of the plurality of vehicles 702B to 702I and/or one or more of the plurality of charging stations 704A to 704F or any combination thereof. The user request may include information associated with the energy amount which may be available for sale, and a bid request for the sale of the energy amount. The energy amount may be less than or equal to the excess energy amount. The bid request may include a first energy price at which the user 116 may intend to sell the energy amount to one or more of the plurality of vehicles 702B to 702I and/or one or more of the plurality of charging stations 704A to 704F or any combination thereof.

The first vehicle 702A may be configured to retrieve from a server (such as the server 112 (FIG. 1), information associated with a first set of vehicles 702B to 702C of the plurality of vehicles 702B to 702I and a first set of charging stations 704A to 704C of the plurality of charging stations 704A to 704F. Each of the first set of vehicles 702B to 702C and the first set of charging stations 704A to 704C may be located within a determined distance (represented by 708) from the first vehicle 702A. The information associated with the first set of vehicles 702B to 702C and the first set of charging stations 704A to 704C may include a location of the respective first set of vehicles 702B to 702C and the first set of charging stations 704A to 704C within the predetermined distance. The determined distance may be input by the user 116 and the first set of vehicles 702B to 702C and the first set of charging stations 704A to 704C may be selected based on the determined distance input by the user 116.

The first vehicle 702 may be configured to communicate a plurality of invite requests 706A to 706E to the first set of vehicles 702B to 702C and the first set of charging stations 704A to 704C within the determined distance to initiate a bidding for the energy transfer. The first set of vehicles 702B to 702C may include a second vehicle 702B, a third vehicle 702C, and the first set of charging stations 704A to 704C may include a first charging station 704A, a second charging station 704B, and a third charging station 704C. For example, the first vehicle 702A may be configured to communicate a first invite request 706A, and a second invite request 706B to the second vehicle 702B and the first charging station 704A, respectively. Similarly, the first vehicle 702A may be configured to communicate a third invite request 706C, a fourth invite request 706D, and a fifth invite request 706E to the third vehicle 702C, the second charging station 704B, and the third charging station 704C, respectively. The first vehicle 702A may be configured to communicate with the first set of vehicles 702B to 702C and the first set of charging stations 704A to 704C in accordance with various wired and wireless communication protocols, as discussed in FIG. 2 and FIG. 3.

Each of the plurality of invite requests 706A to 706E may include information associated with the excess energy amount that the user of the first vehicle 702A may intend to sell. Each of the plurality of invite requests 706A to 706E may further include the bid request for the sale of the excess energy amount and a plurality of data items associated with the first vehicle 702A. The plurality of data items (associated with the first vehicle 702A) may include vehicle identifier information (such as vehicle registration number) of the first vehicle 702A and user identifier information (such as name, employee ID, social security number) of the user 116. In some embodiments, each of the plurality of invite requests 706A to 706E may include a first energy cost for the excess energy amount. The first energy cost may be input by the user 116 or may correspond to the cost of the electric energy of the current day received from the server 112 at the location of the electric charge management device 102 or the first vehicle 702A.

In accordance with an embodiment, each of the first set of vehicles 702B to 702C and the first set of charging stations 704A to 704C may communicate a response for the invite request to the first vehicle 702A. The response may include information associated with the respective first set of vehicles 702B to 702C and the first set of charging stations 704A to 704C. The response may further include a second energy cost. The second energy cost received from each of the first set of vehicles 702B to 702C and the first set of charging stations 704A to 704C may indicate a price at which the respective vehicle or the charging station may buy the excess energy amount from the first vehicle 702A. For example, the second vehicle 702B may communicate a first response to the first vehicle 702A. The first response may include information associated with the second vehicle 702B. The information associated with the second vehicle 702B may further include the vehicle identifier information associated with the second vehicle 702B, the user identifier information of a user of the second vehicle 702B, and the second energy cost at which the second vehicle 702B may buy the excess energy amount form the first vehicle 702A. In some embodiments, the response may further include one of an invite acceptance response and an invite rejection response from the second vehicle 702B. In case of the invite rejection response, the response may not include the second energy cost.

The first vehicle 702A may be configured to receive the response from each of the first set of vehicles 702B to 702C and the first set of charging stations 704A to 704C. The first vehicle 702A may be further configured to select an electric power system from the first set of vehicles 702B to 702C and the first set of charging stations 704A to 704C, to sell the excess energy amount. The first vehicle 702A may select the electric power system based on the vehicle identifier information and the user identification information included in each received responses. In certain scenarios, the first vehicle 702A may be configured to select the electric power system based on the received second energy cost from each of the first set of vehicles 702B to 702C and the first set of charging stations 704A to 704C. The second energy cost of the selected electric power system may be a highest bid amount among the received second energy costs from each of the first set of vehicles 702B to 702C and the first set of charging stations 704A to 704C with the determined distance 708 (such as parking area). The first vehicle 702A may be further configured to select the electric power system based on a difference in the determined first energy cost and the highest second energy cost. In some embodiments, the first vehicle 702A may be configured to select the electric power system in case the highest second energy cost is higher or equal to the determined first energy cost of the excess energy amount.

The first vehicle 702A may be configured to authenticate the selected electric power system based on the vehicle identifier information and the user identification information included in the response of the selected electric power system. The first vehicle 702A may be configured to transfer the excess energy amount to the selected electric power system (one of the plurality of electric power systems 106) based on the authentication.

Figure 7B:
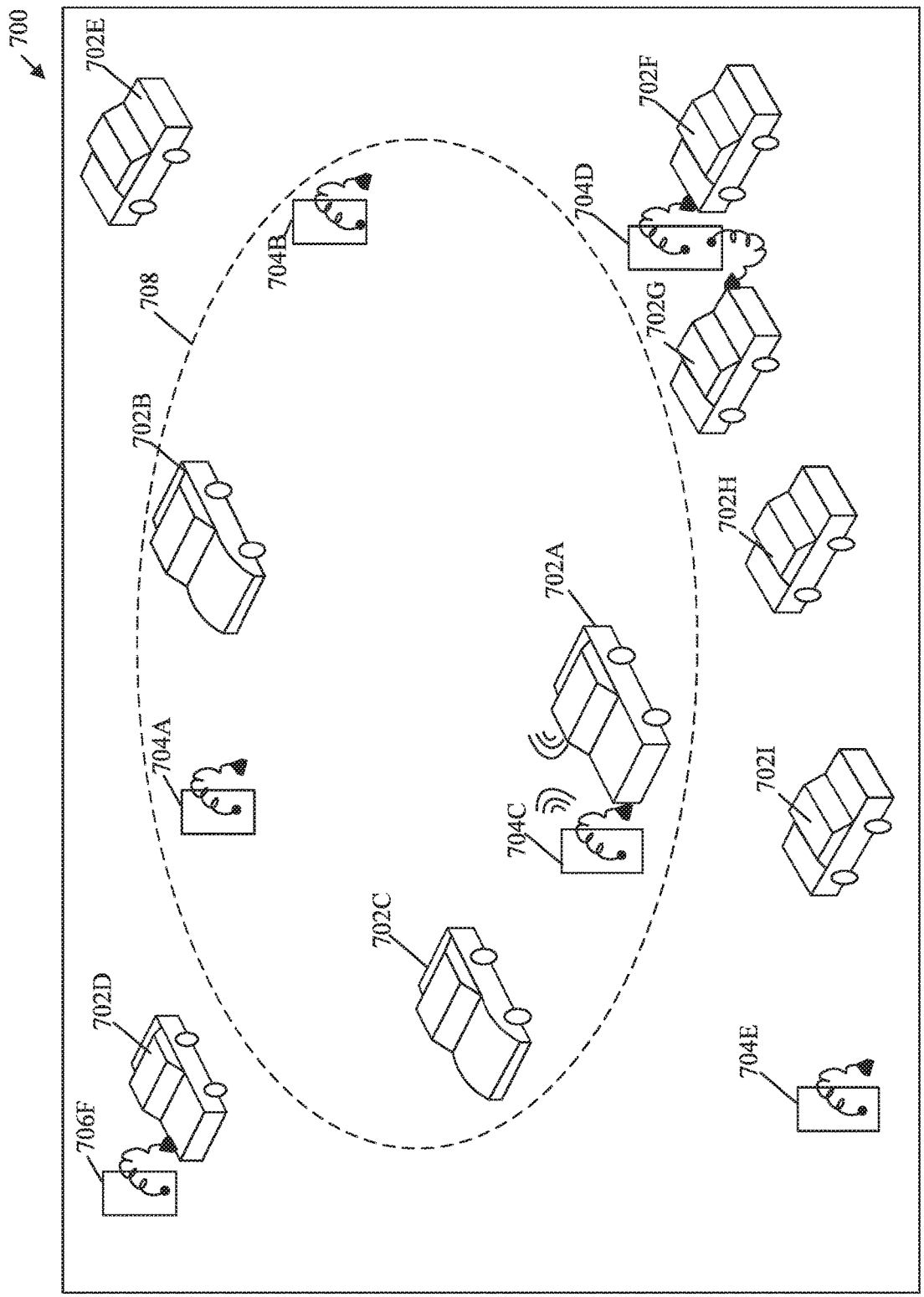
FIG. 7B illustrates an energy transfer between a vehicle and a selected charging station, in accordance with an embodiment of the disclosure.

FIG. 7B illustrates an energy transfer between a vehicle and a selected charging station based on a bidding operation of FIG. 7A, in accordance with an embodiment of the disclosure. FIG. 7B is explained in conjunction with elements from FIGS. 1, 2, 3, 4A, 4B, 5, 6, and 7A. With reference to FIG. 7B, there is shown the first vehicle 702A connected to the third charging station 704C. Therefore, the first vehicle 702A may transfer the excess energy amount to the electric grid 110 (as shown in FIG. 1) through the third charging station 704C. The first vehicle 702A may be configured to select the third charging station 704C to sell (or transfer) the excess energy amount of the first vehicle 702A. The first vehicle 702A may be connected to the third charging station 704C, via a charging cable or wirelessly via a wireless charging interface. In one scenario, the first vehicle 702A may be configured to select the second vehicle 702B to sell (or transfer) the excess energy amount of the first vehicle 702A. In such scenarios, the first vehicle 702A may be connected to the second vehicle 702B via the charging cable or wirelessly.

Figure 7C:
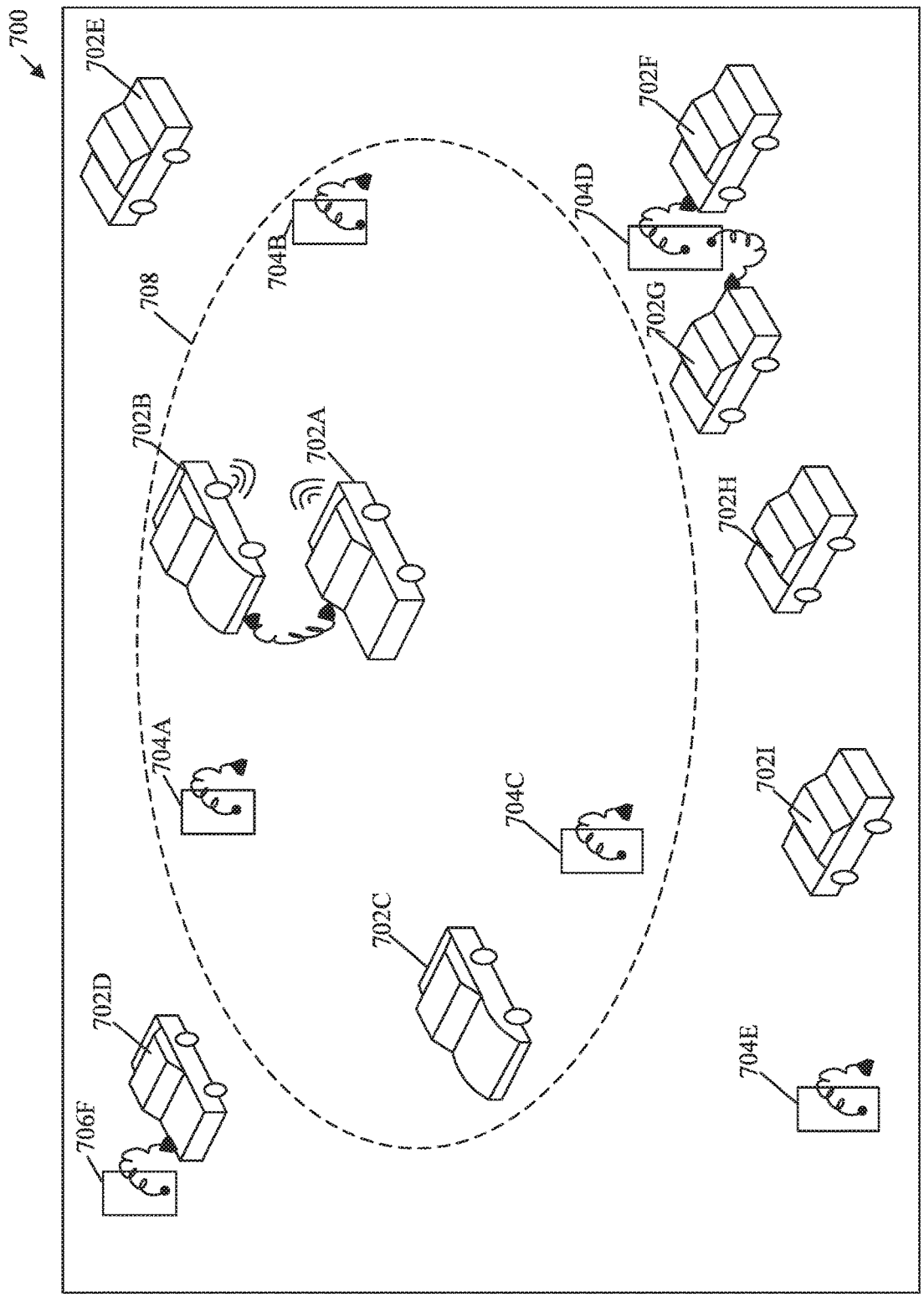
FIG. 7C illustrates an energy transfer between two vehicles, in accordance with an embodiment of the disclosure.

FIG. 7C illustrates an energy transfer between two vehicles based on a bidding operation of the FIG. 7A, in accordance with an embodiment of the disclosure. FIG. 7C is explained in conjunction with elements from FIGS. 1, 2, 3, 4A, 4B, 5, 6, 7A, and 7B. With reference to FIG. 7C, there is shown the first vehicle 702A connected to the second vehicle 702B to transfer the excess energy amount. The first vehicle 702A may be configured to receive first energy cost information from the server 112. The first energy cost information may indicate a first price of the electric energy on a current date-time (current day) at the location of the electric charge management device 102 or the first vehicle 702A. The first vehicle 702A may be configured to determine the current date-time from the real-time clock 326 of the first vehicle 104A. The first price may be indicative of a price of one unit of electricity at a first-time instant. For example, the first-time instant may be indicative of a time of retrieval of the first energy cost information from the server 112. The first vehicle 702A may be configured to update the first energy cost for the excess energy amount, based on the received first price on the current date-time.

The first vehicle 702A may be configured to receive future energy cost information related to a future energy cost from the server 112. The future energy cost may be indicative of the price per unit of electricity at a second-time instant, which may occur after the first-time instant at the location of the electric charge management device 102 or the first vehicle 702A. The future energy cost may indicate a second price of the electric energy on a next day (next to the current day). In some embodiments, the future energy cost information may include future date-time information, which indicates a future date-time period. The future energy cost information may also include the second price of the electric energy on the future date-time period.

The first vehicle 702A may be configured to compare the first price on the current day and the second price on the next day. The first vehicle 702A may be configured to update the first energy cost to sell the excess energy amount, based on the comparison of the first price and the second price of the electric energy. In certain scenarios, when the first price on the current day is determined to be lesser than the second price on the next day, the first vehicle 702A may be configured to charge the battery of the first vehicle 702A (i.e. from the current SOC to a maximum SOC) from the electric grid 110 at the first price on the current day. In some embodiments, the first vehicle 702A may be configured to charge an auxiliary battery of the first vehicle 702A from the current SOC to a maximum SOC of the auxiliary battery on the same current day. On the next day (when the price of the electric energy is higher than that of the current day), the first vehicle 702A may be further configured to transfer (or sell) the excess energy amount of the battery (or the auxiliary battery) to one of the first set of vehicles 702B to 702C and the first set of charging stations 704A to 704C, at the second price, on the next day.

In other scenarios, when the first price on the current day is determined to be higher than the second price on the next day, the first vehicle 702A may be configured to transfer the excess energy amount of the battery (or the auxiliary battery) to one of the first set of vehicles 702B to 702C and the first set of charging stations 704A to 704C at the first price on the current day. On the next day (when the price of the electric energy is cheaper than that of the current day), the first vehicle 702A may be configured to charge the battery (and the auxiliary battery) of the first vehicle 702A from the current SOC to the maximum SOC from the electric grid 110 at the second price on the next day The first vehicle 702A may be configured to extract the future date-time period, related to the second price, from the future energy cost information. The first vehicle 702A may be further configured to charge the battery from the electric grid 110 (at the second price) or sell the excess energy amount to the electric grid 110 (at the second price) on the future data and time extracted from the future energy cost information. Therefore, a capability of the first vehicle 702A (or the electric charge management device 102) to compare the first price (of current day) and the second price (of future day) ensures monetary benefits at the user 116 end and renders an opportunity to the user 116 to select a suitable day time to sell or purchase the excess electric energy based on the comparison.

Figure 8:
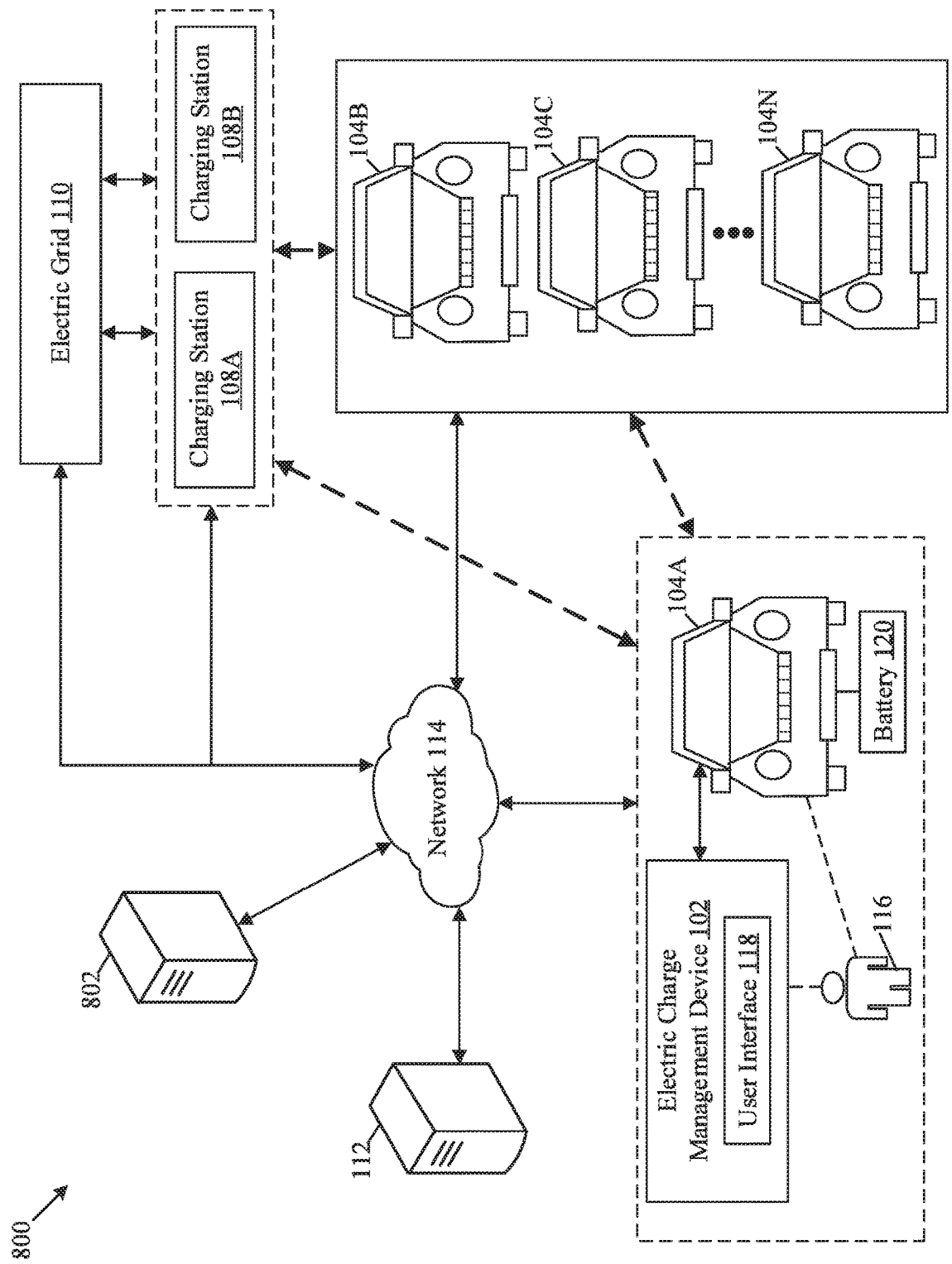
FIG. 8 is a block diagram that illustrates an electric charge management system using an employee-employer relation, in accordance with another embodiment of the disclosure.
Figure 9A:
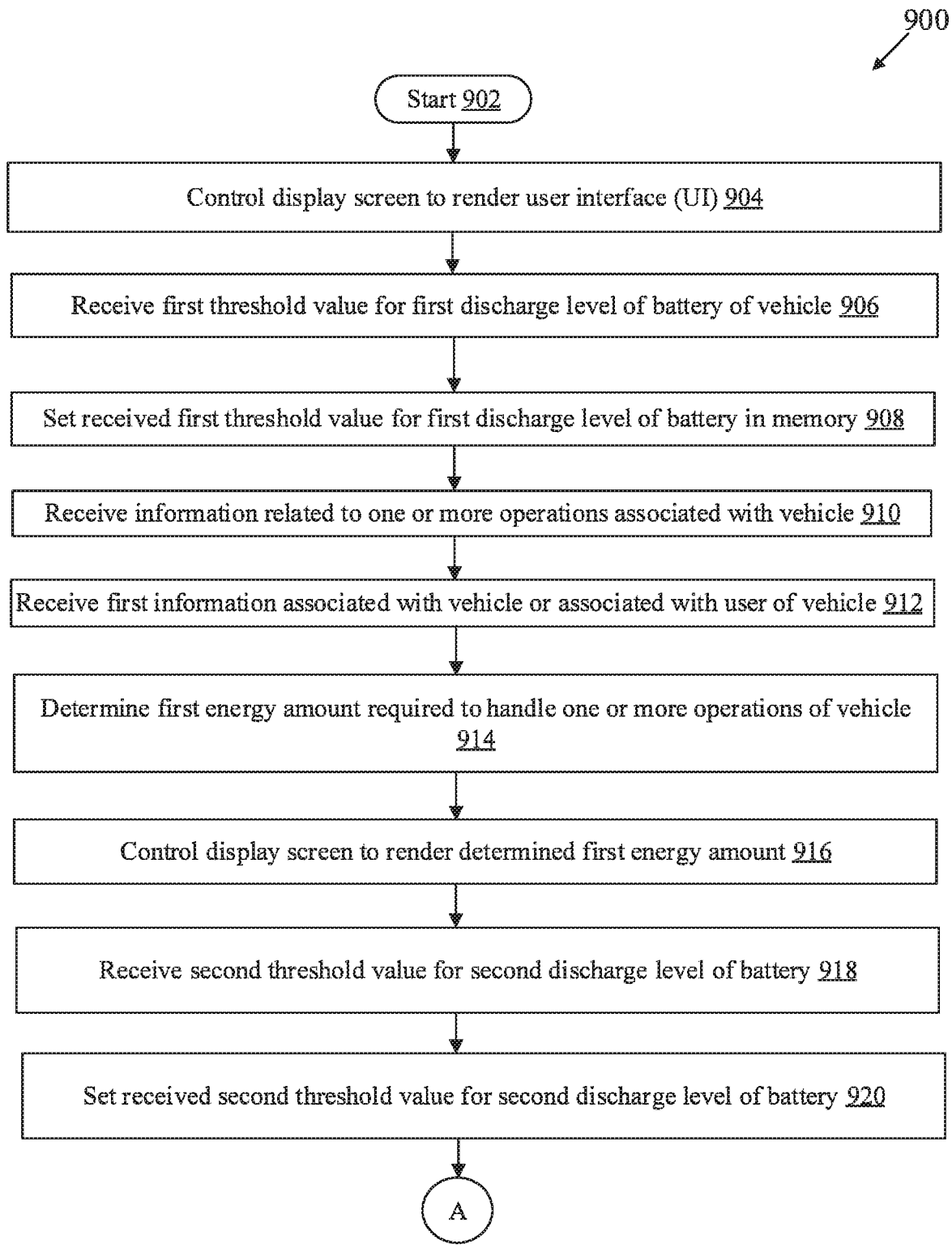
FIGS. 9A, 9B, 9C, and 9D collectively, depict a flow chart that illustrates exemplary operations for electric charge management for a vehicle, in accordance with an embodiment of the disclosure.
Figure 9B:
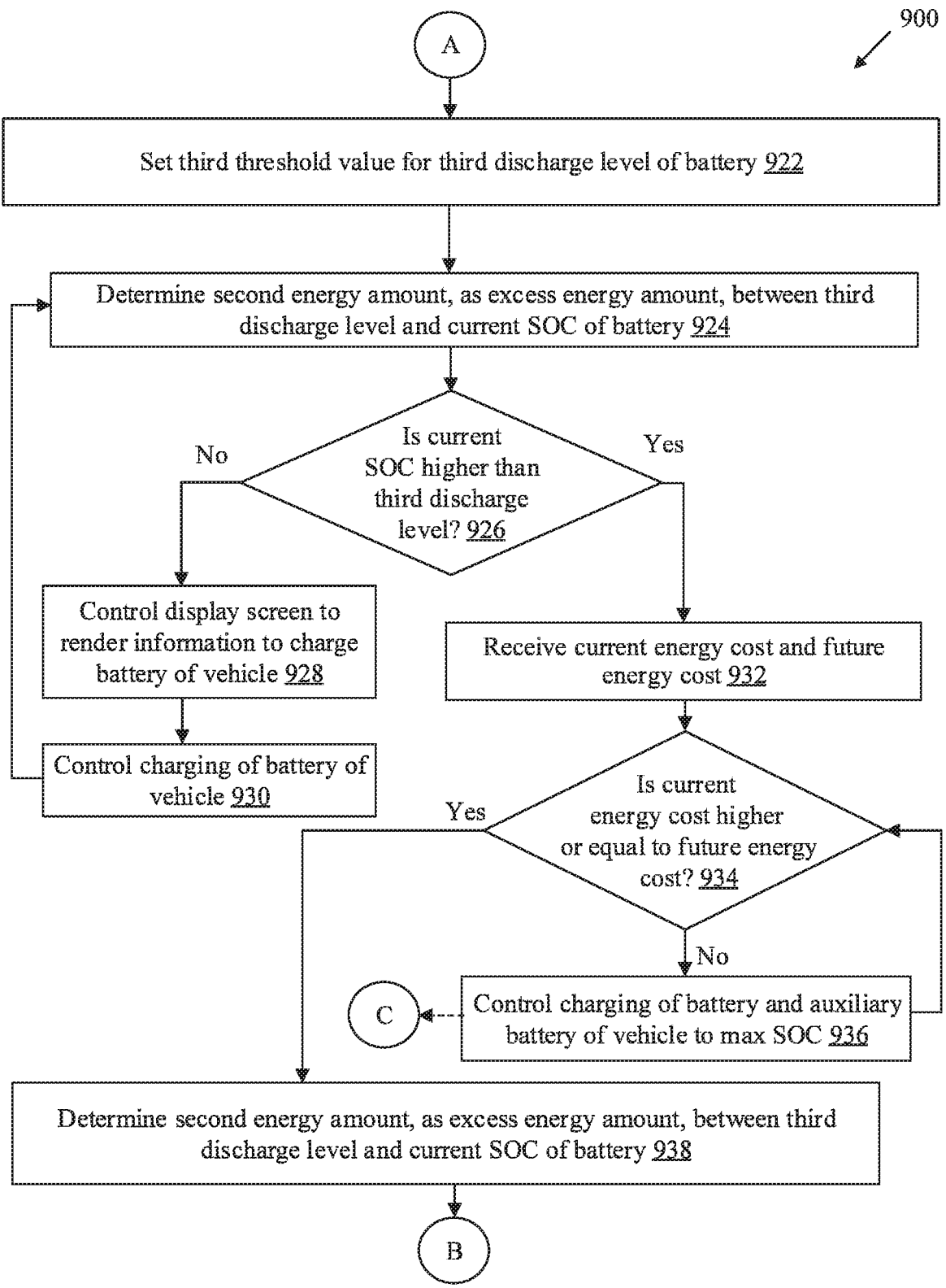
Figure 9C:
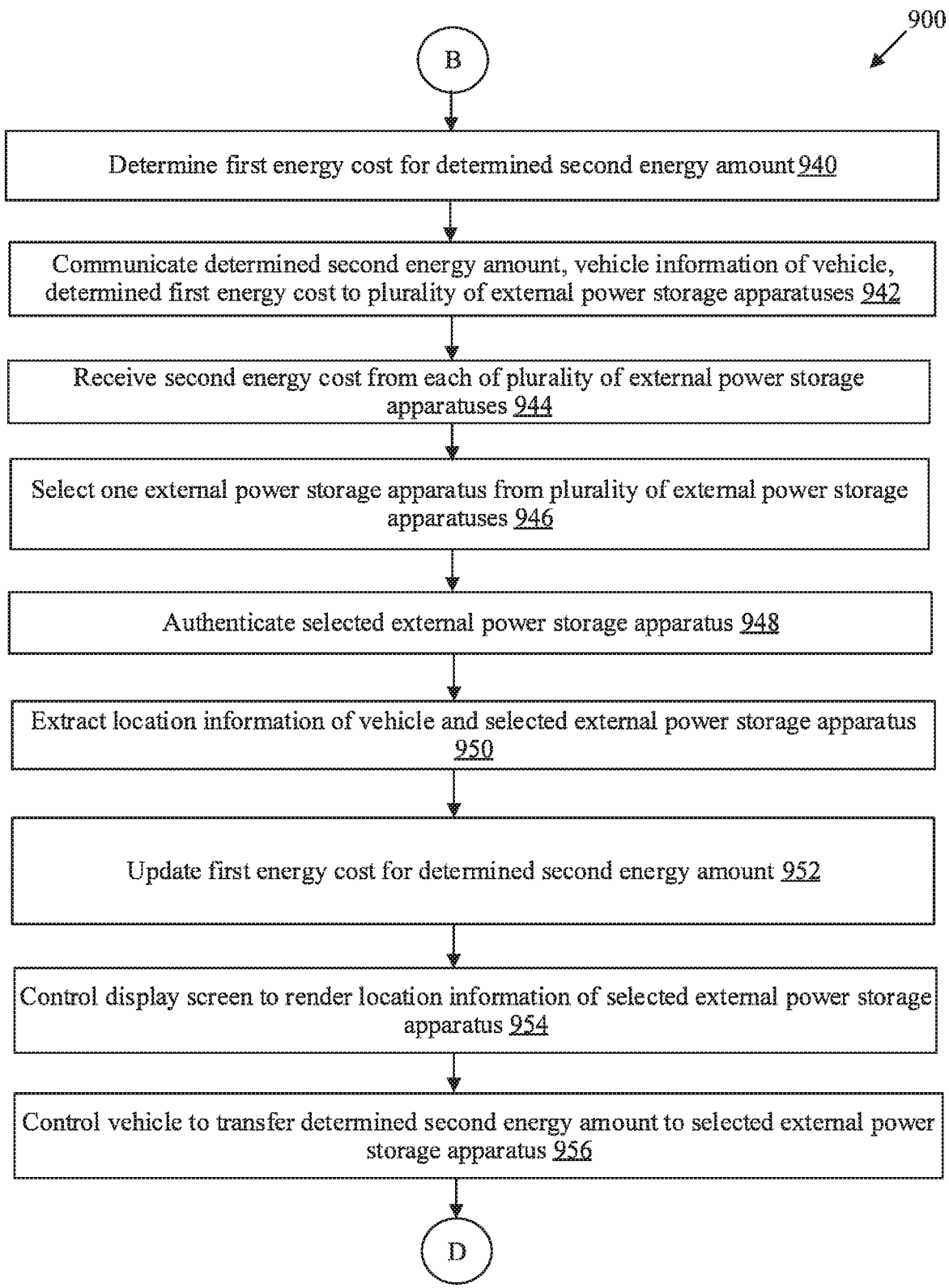
Figure 9D:
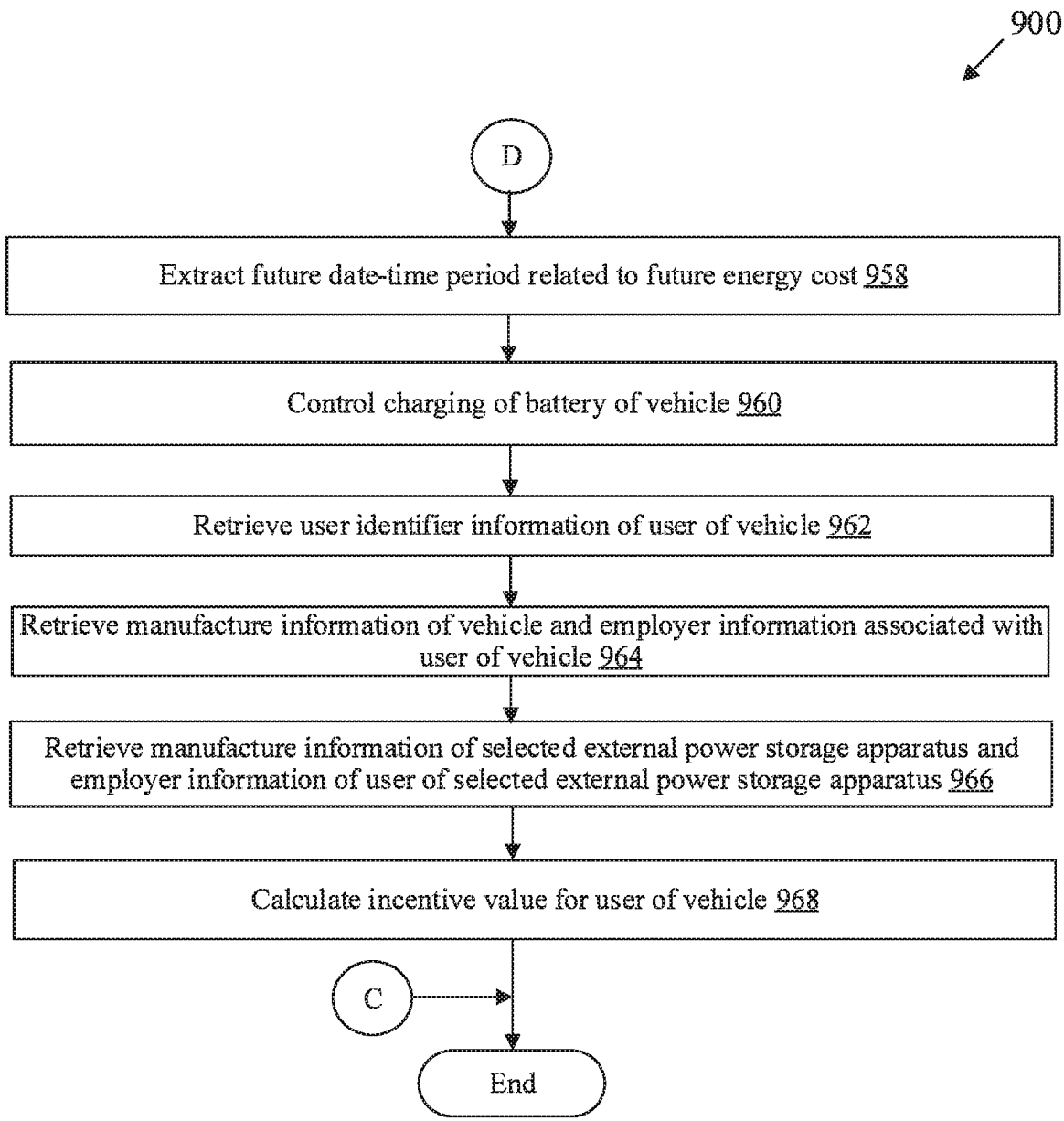

FIG. 8 illustrates an electric charge management system using an employee-employer relationship, in accordance with another embodiment of the disclosure. FIG. 8 may be explained in conjunction with FIGS. 1, 2, 3, 4A, 4B, 5, 6, and 7A to 7C. With reference to FIG. 8, there is shown a second network environment 800, which includes the electric charge management device 102, the plurality of vehicles 104A, 104B, 104C, ..., 104N, the electric grid 110, the plurality of charging stations 108A and 108B, a first server (such as the server 112 (FIG. 1), a second server 802, the network 114, and the user 116.

The second server 802 may include suitable circuitry, interfaces, and/or code that may be configured to store a database which includes a plurality of data items associated with a plurality of users (including the user 116) and the plurality of vehicles 104A, 104B, 104C, ..., 104N. The plurality of data items associated with the plurality of users may include the user identifier information and the employer information associated with the plurality of users. The employer information may indicate a name of an employer of each of the plurality of the users. The employer of each of the plurality of users may be a current employer of respective user of the plurality of users.

The plurality of data items associated with the plurality of vehicles 104A, 104B, 104C, ..., 104N may include the vehicle identifier information and manufacturer information associated with the plurality of vehicles 104A, 104B, 104C, ..., 104N. The manufacturer information may indicate a name of a manufacturer of each of the plurality of vehicles 104A, 1046, 104C, ..., 104N. Examples of the second server 802 may include, but are not limited to, an application server, a cloud server, a web server, a database server, a file server, a mainframe server, or a combination thereof.

In operation, the electric charge management device 102 may be configured to control the first vehicle 104A to transfer the excess energy amount to a selected vehicle of the first set of vehicles 104B to 104N. The selection of the vehicle and the energy transfer between the first vehicle 104A and the selected vehicle, is described in detail, for example in FIG. 7. The electric charge management device 102 may be further configured to receive the user identifier information and the employer information associated with the user 116, from the second server 802. The electric charge management device 102 may be further configured to receive the manufacturer information of the first vehicle 104A, from the second server 802. The electric charge management device 102 may be further configured to search the manufacturer information of the first vehicle 104A and the employer information associated with the user 116 in the second server 802 based on the received user identifier information. The electric charge management device 102 may be configured to determine a relationship between the received user information, the manufacturer information, and the employer information.

The electric charge management device 102 may be configured to calculate an incentive value (for example, a bonus amount) for the user 116, based on the determined relationship and the transferred excess energy amount between the first vehicle 104A and the selected vehicle. The incentive value may indicate a monetary benefit for the user 116 to transfer the excess energy amount (through the first vehicle 104A associated with the user 116) to the selected vehicle.

The electric charge management device 102 may be further configured to receive the manufacturer information and the vehicle identification information associated with the selected vehicle, from the second server 802. The electric charge management device 102 may be configured to determine whether the employer information of the user 116 of the first vehicle 104A is similar (as relationship) to the employer information of a user of the selected vehicle. The electric charge management device 102 may be configured to update the calculated incentive value based on the determination that the employer information of the user 116 of the first vehicle 104A is similar to the employer information of the user of the selected vehicle. The electric charge management device 102 may be configured to increase the incentive value of the user 116 based on the determination. This indicates that the excess energy amount is shared with a vehicle associated with another user who belongs to the same employer, to which the user 116 belongs.

The electric charge management device 102 may be configured to update the calculated incentive value of the user 116, based on the determination that the manufacturer information of the first vehicle 104A (associated with the user 116) is similar to the manufacturer information of the selected vehicle (to which the excess energy may be transferred). This indicates that the first vehicle 104A is controlled to provide the excess energy amount to the selected vehicle, which belongs to the same manufacture to which the first vehicle 104A belongs.

The electric charge management device 102 may be configured to assign the incentive value to a financial account associated with the user 116 for the energy transfer. Therefore, the capability of the electric charge management device 102 to calculate and assign the incentive value may further encourage the user 116 to transfer the electric energy to vehicles of users who belongs to the employer of the user 116 or transfer the electric energy among vehicles that have a common manufacturer. The second server 802 may be configured to calculate the incentive value for the user 116 and assign the calculated incentive value to the financial account associated with the user 116.

FIGS. 9A, 9B, 9C, and 9D collectively, depict a flow chart that illustrates exemplary operations for vehicle-to-grid energy transfer, in accordance with an embodiment of the disclosure. With reference to FIGS. 9A, 9B, 9C, and 9D, there is shown a flowchart 900. The flowchart 900 is described in conjunction with FIGS. 1, 2, 3, 4A, 4B, 5, 6, 7A, 7B, 7C, and 8. The operations from 904 to 968 may be implemented in the electric charge management device 102. The operations of the flowchart 900 may start at 902 and proceed to 904.

At 904, a display screen may be controlled to render a user interface (UI). The electric charge management device 102 may be configured to control the display screen 212 to render the UI 118 to the user 116. The UI 118, is described in detail above, for example in FIG. 5.

At 906, a first threshold value for a first discharge level of a battery (such as the battery 120 in FIG. 3) of a vehicle (such as the first vehicle 104A of FIG. 1) may be received, via the UI 118. The first discharge level may be greater than a zero state of charge (SOC) of the battery 120 of the first vehicle 104A. The electric charge management device 102 may be configured to receive the first threshold value for the first discharge level from the user 116 through the UI 118. An example, of the receipt of the first threshold value, is described in detail, for example, in FIGS. 1 and 5.

At 908, the received first threshold value for the first discharge level of the battery 120 may be set. The electric charge management device 102 may be configured to set the received first threshold value in a memory (such as the memory 210 in FIG. 2 or the memory 306 in FIG. 3). The electric charge management device 102 may be configured to communicate the received first threshold value to a server (such as the server 112, through a network (such as the network 114 in FIG. 1). The server 112 may be further configured to store the received first threshold value for the battery 120 of the first vehicle 104A. The electric charge management device 102 may be configured to control the depletion of a capacity (in Ah) of the battery 120 beyond the first discharge level based on the set first threshold value.

At 910, information related to one or more operations associated with the first vehicle 104A may be received. The electric charge management device 102 may be configured to receive the information (to control the first vehicle 104A to handle the one or more operations associated with the first vehicle 104A) from the user 116, via the UI 118. An example of receipt of the information via the UI 118, is described in detail, for example in FIG. 5. The electric charge management device 102 may be configured to extract operational information from the information received from the UI 118, which indicates the one or more user preferences of the user 116 for the one or more operations of the first vehicle 104A.

At 912, first information associated with the first vehicle 104A and/or associated with the user 116 of the first vehicle 104A may be received. The electric charge management device 102 may be configured to receive the first information from the server 112 or from the user 116, via the UI 118. The first information may include, but are not limited to, the environmental information, the historical travel information of the first vehicle 104A, the calendar information of the user 116, the user-preference information of the user 116, the carbon dioxide ($CO_2$) saving information of the first vehicle 104A, the financial saving information of the user 116, the charging-discharging information of the battery 120 of the first vehicle 104A, or navigational information of the first vehicle 104A to reach to a destination point. The first information, is described in detail, for example in FIGS. 1 and 5.

At 914, a first energy amount required to handle the one or more operations of the first vehicle 104A may be determined. The electric charge management device 102 may be configured to determine the first energy amount based on the received information related to the one or more operations and the received first information.

At 916, the display screen may be controlled to display the determined first energy amount. The electric charge management device 102 may be configured to control the display screen to display the determined first energy amount (required by the first vehicle 104A to handle the one or more operations) for the user 116.

At 918, a second threshold value for a second discharge level of the battery 120 may be received, via the UI 118. The electric charge management device 102 may be configured to receive the second threshold value as a user input from the user 116, based on rendered first energy amount. An example, for receipt of the second threshold value, is described in detail, for example, in FIGS. 1 and 5.

At 920, the received second threshold value may be set for the second discharge level of the battery 120. The electric charge management device 102 may be configured to set the received second threshold value from the user 116. The second threshold value may be greater than the first threshold value. The electric charge management device 102 may be configured to update (or validate) the received second threshold value from the user 116 based on the received first information and the determined first energy amount. The electric charge management device 102 may be further configured to set the updated (or validated) second threshold value.

At 922, a third threshold value may be set for a third discharge level of the battery 120. The electric charge management device 102 may be configured to set the third threshold value for the third discharge level of the battery 120. The third threshold value may be higher than the second threshold value. An energy amount between the third discharge level and the second discharge level may correspond to a margin energy amount of the battery 120. The margin energy amount (of the battery 120) may be required by the first vehicle 104A to handle the one or more operations after the electric energy has been transferred from the first vehicle 104A to an electric grid (such as the electric grid 110) or to another vehicle (such as one of the first set of vehicles 1046 to 104N.

At 924, a second energy amount between the third discharge level and current SOC of the battery 120 may be determined as an excess energy amount. The electric charge management device 102 may be configured to determine the second energy amount as the excess energy amount of the battery 120 of the first vehicle 104A. The excess energy amount may be sold (or transferred) to one or more of a plurality of electric power systems 106 (such as the electric grid 110, the plurality of charging stations 108A and 108B, and the first set of vehicles 104B to 104N of FIG. 1).

At 926, it may be determined whether the current SOC is higher than the third discharge level of the battery 120. The electric charge management device 102 may be configured to determine whether the current SOC is higher than the third discharge level of the battery 120. In cases, where the current SOC is greater than the third discharge level, control passes to 932. In cases, where the current SOC is less than or equal to the third discharge level, control passes to 928.

At 928, the display screen may be controlled to render information to charge the battery 120 of the first vehicle 104A. The electric charge management device 102 may be configured to control the display screen to render the information to charge the battery 120. The rendered information may correspond to a visual alert for the user 116 to charge the battery 120 as the battery 120 may not have a sufficient excess energy amount to transfer to the one or more of the plurality of electric power systems 106.

At 930, the charging of the battery 120 of the first vehicle 104A may be controlled. The electric charge management device 102 may be configured to control the charging of the battery 120. The battery 120 of the first vehicle 104A may be charged until the current SOC corresponds to the sufficient excess energy amount for the electric energy transfer. Control passes to 924.

At 932, a current energy cost and a future energy cost may be received. The electric charge management device 102 may be configured to receive the current energy cost and the future energy cost from the server 112. The current energy cost may correspond to a first price (per unit of electricity) of the electric energy at a first-time instant and at the location of the electric charge management device 102 or the first vehicle 104A. The first instant may be indicative of a time of retrieval of the current energy cost from the server 112. The current energy cost may correspond to the first price of the electric energy on a current day. The future energy cost may indicate a second price of the electric energy at a second-time instant (such as a day next to the current day) and at the location of the electric charge management device 102 or the first vehicle 104A. In some embodiments, the future energy cost may be related to future date-time information which indicates a future date-time period. The future energy cost may indicate the second price of the electric energy on the future date-time period.

At 934, it is determined whether the current energy cost is higher than or equal to the future energy cost. The electric charge management device 102 may be configured to determine whether the current energy cost is higher than or equal to the future energy cost. In cases, where the current energy cost is higher than or equal to the future energy cost, control passes to 940. In cases, where the current energy cost is lesser than the future energy cost, control passes to 936.

At 936, the charging of the battery 120 and the charging of an auxiliary battery (such as the auxiliary battery 322 in FIG. 3) of the first vehicle 104A may be controlled to be charged to a maximum SOC of the battery 120 and the auxiliary battery 322, respectively. The electric charge management device 102 may be configured to control the charging of the battery 120 and the charging of the auxiliary battery 322 as the current energy cost may be less than the future energy cost. In one case, a recheck may be done at a different time or day, to determine whether the current energy cost is higher than or equal to the future energy cost at a future date-time period. Thus, control returns to 934. The future date-time period related to the future energy cost may be extracted. The electric charge management device 102 may be configured to extract the future date-time period (for example, the next day, future date-time) from information which includes the future energy cost at the time of retrieval from the server 112. The electric charge management device 102 may be configured to extract the future date-time period (when the future energy cost is higher than the current energy cost) to transfer the excess energy amount to the one or more of the plurality of electric power systems 106 on the future date-time period. In another case, control passes to end.

At 938, the second energy amount, as the excess energy amount, between the third discharge level and the current SOC of the battery 120 may be determined based on the extracted future date-time period. The electric charge management device 102 may be configured to determine the second energy amount as the excess energy amount on the future date-time period (such as the next day or the future date time).

At 940, a first energy cost for the determined second energy amount may be determined based on the received current energy cost. The electric charge management device 102 may be configured to determine the first energy cost for the determined second energy amount (excess energy amount), based on the received current energy cost (which may be higher than the future energy cost). The first energy cost may indicate a price at which the electric energy of the battery 120 is to be transferred to the one or more of the plurality of electric power systems 106.

At 942, the determined second energy amount, vehicle information of the first vehicle 104A, and the determined first energy cost may be communicated to the plurality of electric power systems 106. The electric charge management device 102 may be configured to communicate the determined second energy amount (an excess energy amount), the vehicle information (such as a vehicle registration number) and the first energy cost in a bidding request, to the plurality of electric power systems 106.

At 944, a second energy cost may be received from each of the plurality of electric power systems 106. The electric charge management device 102 may be configured to receive the second energy cost from each of the plurality of electric power systems 106. The second energy cost may indicate a price at which an external electric power system from the plurality of electric power systems 106 may purchase the second energy amount from the first vehicle 104A.

At 946, one external electric power system may be selected from the plurality of electric power systems 106 based on the second energy cost received from each of plurality of electric power systems 106. The electric charge management device 102 may be configured to select one external electric power system based on the received second energy costs. The second energy cost of the selected external electric power system may be the highest amount among the received second energy cost from each of the plurality of electric power systems 106. Examples of the selection of the one external electric power system, are described in detail, for example, in FIG. 7.

At 948, the selected external electric power system may be authenticated. The electric charge management device 102 may be configured to authenticate the selected external electric power system based on information related to the selected external electric power system. The information may correspond to a user or a location of the selected external electric power system. The electric charge management device 102 may be configured to extract the information from the server 112.

At 950, location information of the first vehicle 104A and the selected external electric power system may be extracted based on the authentication. The electric charge management device 102 may be configured to extract the location information based on a successful authentication of the selected external electric power system. The location information may indicate a geo-location of the first vehicle 104A and the selected external electric power system.

At 952, the first energy cost for the determined second energy amount may be updated, based on the received second energy cost from the selected external electric power system and the extracted location information. The electric charge management device 102 may be configured to update the first energy cost (at which the electric energy has to be sold) similar to the second energy cost from the selected external electric power system. The electric charge management device 102 may be further configured to update the first energy cost based on the determined location of the selected external electric power system. In some embodiments, the electric charge management device 102 may be configured to increase the first energy amount when the selected external electric power system is located far (beyond a predefined distance) from the first vehicle 104A.

At 954, the display screen may be controlled to render the location information of the selected external electric power system. The electric charge management device 102 may be configured to control the display screen (such as the display screen 212 in FIG. 2 or the display screen 310 in FIG. 3) to render the location information of the selected external electric power system. The location information may include map information for the user 116 to reach to the location of the selected external electric power system for energy transfer.

At 956, the first vehicle 104A may be controlled to transfer the determined second energy amount to the selected external electric power system. The electric charge management device 102 may be configured to control the first vehicle 104A to transfer the second energy amount (excess energy amount in the battery 120) to the selected external electric power system at the updated first energy cost.

At 958, the future date-time period related to the future energy cost may be extracted. After the excess energy amount transferred to the selected external electric power system on the current day, the electric charge management device 102 may be configured to extract the future date-time period related to the future energy cost (when the future energy cost is lesser than the current energy cost on the future date-time period).

At 960, the charging of the battery 120 of the first vehicle 104A may be controlled, based on the extracted future date-time period. The electric charge management device 102 may be configured to control the charging of the battery 120 (say to a maximum SOC) on the extracted future date-time period. The electric charge management device 102 may be further configured to control the charging of the auxiliary battery 322 on the extracted future date-time period based on the current SOC of the auxiliary battery 322.

At 962, the user identifier information of the user 116 of the first vehicle 104A may be retrieved. The electric charge management device 102 may be configured to retrieve the user identifier information (such as a name, an employee ID, a social security number (SSN) of the user 116 from the server 112 or from the memory 210 (or the memory 306).

At 964, manufacturer information of the first vehicle 104A and employer information associated with the user 116 of the first vehicle 104A may be retrieved. The electric charge management device 102 may be configured to retrieve the manufacturer information and the employer information based on the retrieved user information. The electric charge management device 102 may be configured to retrieve the manufacturer information and the employer information from the second server 802 (different from the server 112).

At 966, manufacturer information of the selected external electric power system and employer information of a user of the selected external electric power system may be retrieved. The electric charge management device 102 may be configured to retrieve the manufacturer information of the selected external electric power system and the employer information of the user of the selected external electric power system from the second server 802.

At 968, an incentive value for the user 116 of the first vehicle 104A may be calculated. The electric charge management device 102 may be configured to calculate the incentive value for the user 116 based on the retrieved manufacturer information of the first vehicle 104A and the employer information associated with the user 116 of the first vehicle 104A. The calculation of the incentive value may be further based on the manufacturer information of the selected external electric power system, and the employer information of the user of the selected external electric power system. Control passes to end.

Various embodiments of the disclosure provide an electric charge management device for a vehicle. The electric charge management device (such as the electric charge management device 102 (FIG. 1)) may include a display screen (such as the display screen 212 (FIG. 2)) and circuitry (such as the circuitry 202 (FIG. 2)). The display screen may be configured to render a UI (such as the UI 118 (FIG. 2)). The circuitry may be configured to set a first threshold value for a first discharge level (for example the first discharge level 402 (FIG. 4A)) of a battery (such as the battery 120 (FIG. 3)) of the vehicle (such as the first vehicle 104A (FIG. 1)). The first discharge level may be greater than a zero state of charge (SOC) of the battery 120. The circuitry 202 may be configured to receive first information associated with the first vehicle 104A or a user (for example the user 116) of the vehicle. The circuitry may be configured to set a second threshold value for a second discharge level (for example the second discharge level 404 (FIG. 4A)) of the battery 120. The circuitry 202 may be configured to set the second threshold value based on the received first information and a first energy amount of the battery 120 required for at least one operation associated with the first vehicle 104A. The second threshold value may be greater than the first threshold value. The circuitry 202 may be configured to determine a first energy cost for a second energy amount between the second discharge level and a current SOC of the battery 120. The circuitry 202 may be configured to control the first vehicle 104A to transfer the second energy amount to an external electric power system (such as one of the electric grid 110, the plurality of charging stations 108A and 108B, and the first set of vehicles 104B to 104N (FIG. 1)) which may be different from the electric charge management device, based on the determined first energy cost.

The circuitry 202 may be further configured to receive the first threshold value and the second threshold value as user inputs through a plurality of UI elements (such as the plurality of UI elements 504 to 524 (FIG. 5) of the rendered UI 118. The circuitry 202 may be further configured to update the received second threshold value based on the received first information and the first energy amount of the battery 120 required for the at least one operation associated with the first vehicle 104A. The circuitry 202 may be further configured to control the display screen 212 to render at least one of the first threshold value, the second threshold value, remaining battery information of the battery 120, the determined first energy cost, information about the at least one operation, transfer status information to transfer the second energy amount to the external electric power system, or the first information associated with the first vehicle 104A or the user 116 of the first vehicle 104A.

The at least one operation may include at least one of: a travel operation of the first vehicle 104A from a starting point to a destination point, a Heating ventilation and air conditioning (HVAC) operation, an entertainment operation, a lighting operation, a sensing operation, a vehicle configuration operation, or a propulsion operation. The first information may include at least one of: environmental information, historical travel information of the first vehicle 104A, calendar information of the user 116, user-preference information of the user 116, Carbon dioxide ($CO_2$) saving information of the first vehicle 104A, financial saving information of the user 116, charging-discharging information of the battery 120, navigational information of the first vehicle 104A to reach to a destination point, or an output from a learning engine in the electric charge management device.

The external electric power system may include at least one of the electric grid 110, a charging station 108A or 108B, another vehicle (such as one of the first set of vehicles 104B to 104N) that uses at least one electric motor powered by one or more battery packs for propulsion, or a device with capability to store energy. The circuitry 202 may be configured to determine the first energy cost based on at least one of: information related to the external electric power system, information related to a user of the external electric power system, or a geographical location of the first vehicle 104A.

The circuitry 202 may be configured to transmit the determined first energy cost to the external electric power system. The circuitry 202 may be further configured to receive a response, which indicates an acceptance of the first energy cost, from the external electric power system. The circuitry 202 may be further configured to control the first vehicle 104A to transfer the second energy amount to the external electric power system based on the received response. The circuitry 202 may be configured to authenticate the external electric power system and control the first vehicle 104A to transfer the second energy amount to the external apparatus based on the authentication.

The circuitry 202 may be further configured to communicate an invite request to a plurality of electric power systems 106 (such as the electric grid 110, the charging stations 108A and 108b, and the first set of vehicles 104b to 104N (FIG. 1). The invite request may include a vehicle identifier of the first vehicle 104A, a user identifier of the user 116, the second energy amount that may indicate as an excess energy amount available for sale, and a bid request for the excess energy amount. The circuitry 202 may be further configured to receive a second energy cost from each of the plurality of electric power systems 106. The circuitry 202 may be further configured to select one of the plurality of electric power systems 106, as the external electric power system, based on the received second energy cost from each of the plurality of electric power systems 106. The circuitry 202 may be further configured to control the first vehicle 104A to transfer the second energy amount to the selected one of the plurality of electric power systems 106 based on a difference in the determined first energy cost and the second energy cost of the selected one of the plurality of electric power systems 106.

The circuitry 202 may be configured to set a third threshold value for a third discharge level (such as the third discharge level 412 (FIG. 4)) of the battery 120. The third threshold value is higher than the second threshold value and a third energy amount between the third discharge level 412 and the second discharge level 404 may be a margin energy amount of the battery 120 required for the at least one operation. The circuitry 202 may be configured to determine a current time of day associated with a current geolocation of the first vehicle 104A. The circuitry 202 may be further configured to control the first vehicle 104A to charge the battery 120 from the current SOC to a maximum SOC of the battery 120 or to transfer the second energy amount to the external electric power system based on the determined current time of day.

The circuitry 202 may be configured to generate recommendation information which may indicate at least one of a time period to transfer the second energy amount to the external electric power system or a location of the external electric power system. The circuitry 202 may be further configured to control the display screen 212 to render the generated recommendation information for the user 116 of the first vehicle 104A in accordance to a motion state of the first vehicle 104A.

The circuitry 202 may be configured to receive user information of the user 116 of the first vehicle 104A from the server 112. The circuitry 202 may be further configured to search manufacturer information of the first vehicle 104A and employer information associated with the user 116 in the server 112, based on the received user information. The circuitry 202 may be further configured to determine a relationship between the received user information, the manufacturer information, and the employer information. The circuitry 202 may be further configured to determining an energy cost for the second energy amount based on the determined relationship. The circuitry 202 may be further configured to control the first vehicle 104A to transfer the second energy amount to the external electric power system, based on the determined energy cost.

Various embodiments of the disclosure provide an electric charge management device for a vehicle. The electric charge management device (such as the electric charge management device 102 (FIG. 1)) may include a memory (such as the memory 210 (FIG. 2)). The memory 210 may be configured to store a threshold value for a discharge level (for example the second discharge level 404 (FIG. 4A)) of a battery (such as the battery 120 (FIG. 3)) of the vehicle (such as the first vehicle 104A (FIG. 1)). The discharge level may be greater than a zero state of charge (SOC) of the battery 120. A first energy amount between the second discharge level 404 and the zero SOC is required for at least one operation associated with the first vehicle 104A. The electric charge management device 102 may further include circuitry, coupled with the memory 210. The circuitry 202 may be configured to determine a second energy amount between the second discharge level 404 and a current SOC of the battery 120. The circuitry 202 may be further configured to receive first information and second information from a server (such as the server 112 (FIG. 1)). The first information may include a first energy cost at the time of retrieval of the first information from the server 112. The second information may indicate a future energy cost for a specified time period. The circuitry 202 may be further configured to compare the first information and the second information and determine a second energy cost for the second energy amount based on the comparison. The circuitry 202 may be further configured to control the first vehicle 104A to transfer the second energy amount to an external electric power system, which is different from the electric charge management device, based on the determined second energy cost.

The circuitry 202 may be further configured to extract future date-time information from the second information received from the server 112. The future date-time information may indicate the specified time period related to the future energy cost. The circuitry 202 may be further configured to control the first vehicle 104A to transfer the second energy amount to the external electric power system based on the determined second energy cost and the future date-time information.

The circuitry 202 may be further configured to control the first vehicle 104A to charge the battery from the current SOC to a maximum SOC of the battery 120. Such control may be done a determination that the first energy cost in the first information is less than the future energy cost in the second information. The circuitry 202 may be further configured to control the first vehicle 104A to transfer the second energy amount to an auxiliary battery (such as the auxiliary battery 322 (FIG. 3)) of the first vehicle 104A. Such control may be done based on a determination that the first energy cost in the first information is higher than the future energy cost in the second information. The circuitry 202 may be further configured to control the first vehicle 104A to transfer the second energy amount to the external electric power system based on the determination that the first energy cost in the first information is higher than the future energy cost in the second information.

The circuitry 202 may be further configured to control the first vehicle 104A to transfer the second energy amount to the external electric power system based on future date-time information included in the second information. The future date-time information may indicate the specified time period related to the future energy cost.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electric charge management device for a vehicle, comprising:
   a memory configured to store a value of a discharge level of a battery of the vehicle, wherein the discharge level is greater than a zero state of charge (SOC) of the battery, and wherein a first energy amount between the discharge level and the zero SOC is required for at least one operation associated with the vehicle; and
   circuitry coupled with the memory, configured to:
      determine a second energy amount between the discharge level and a current SOC of the battery;
      receive first information and second information from a server, wherein the first information includes a first energy cost at the time of retrieval of the first information from the server, and wherein the second information indicates a future energy cost for a specified time period;
      compare the first information and the second information;
      determine a second energy cost for the second energy amount based on the comparison;
      control the vehicle to transfer the second energy amount to an external electric power system, which is different from the electric charge management device, based on the determined second energy cost;
      control the vehicle to transfer the second energy amount to an auxiliary battery of the vehicle, based on a determination that the first energy cost in the first information is higher than the future energy cost in the second information; and control the auxiliary battery to transfer the stored second energy amount to the external electric power system based on future date-time information included in the second information, wherein the future date-time information indicates the specified time period related to the future energy cost.

2. The electric charge management device according to claim 1, wherein the circuitry is further configured to:
extract future date-time information from the second information received from the server, wherein the future date-time information indicates the specified time period related to the future energy cost; and
control the vehicle to transfer the second energy amount to the external electric power system based on the determined second energy cost and the future date-time information.

3. The electric charge management device according to claim 1, wherein the circuitry is further configured to control the vehicle to charge the battery from the current SOC of the battery to a maximum SOC of the battery, based on a determination that the first energy cost in the first information is less than the future energy cost in the second information.

* * * * *